United States Patent
Murata et al.

(10) Patent No.: US 6,781,946 B2
(45) Date of Patent: Aug. 24, 2004

(54) OPTICAL PICKUP APPARATUS AND DISK DRIVE APPARATUS

(75) Inventors: Morihiro Murata, Saitama (JP); Akira Suzuki, Kanagawa (JP)

(73) Assignee: Sony Corporation (JP)

( * ) Notice: Subject to any disclaimer, the term of this patent is extended or adjusted under 35 U.S.C. 154(b) by 365 days.

(21) Appl. No.: 09/988,757

(22) Filed: Nov. 20, 2001

(65) Prior Publication Data

US 2002/0060974 A1 May 23, 2002

(30) Foreign Application Priority Data

Nov. 22, 2000 (JP) .................................... P2000-355864
Sep. 28, 2001 (JP) .................................... P2001-301594

(51) Int. Cl.$^7$ ................................................ G11B 7/00
(52) U.S. Cl. ................................................ 369/112.23
(58) Field of Search ....................... 369/112.01, 112.23, 369/126, 44.14, 44.22

(56) References Cited

U.S. PATENT DOCUMENTS 6,091,694 A    7/2000  Spath
6,333,900 B1 * 12/2001 Maro et al. ............... 369/13.17

FOREIGN PATENT DOCUMENTS

JP          09120562 A     5/1997
JP          2000-111719 A  4/2000

OTHER PUBLICATIONS

Singapore Search and Examination Report dated Mar. 20, 2003.

* cited by examiner

*Primary Examiner*—Paul W. Huber
(74) *Attorney, Agent, or Firm*—Rader, Fishman & Grauer PLLC; Ronald P. Kananen

(57) ABSTRACT

An optical pickup apparatus for recording and/or reading a signal to and from a signal recording layer of an optical disk by applying a light beam to the signal recording layer is provided to prevent a collision between the optical disk and an objective lens, and prevent and reduce damage of the signal recording layer of the optical disk. The optical pickup apparatus is provided with the objective lens for applying a light beam to the signal recording layer, a lens holder supporting the objective lens, and a coating layer formed on the disk side end face of the lens holder. The coating layer is formed of a material softer than the optical disk and having favorable slidability, and projected over the objective lens toward the optical disk.

32 Claims, 24 Drawing Sheets

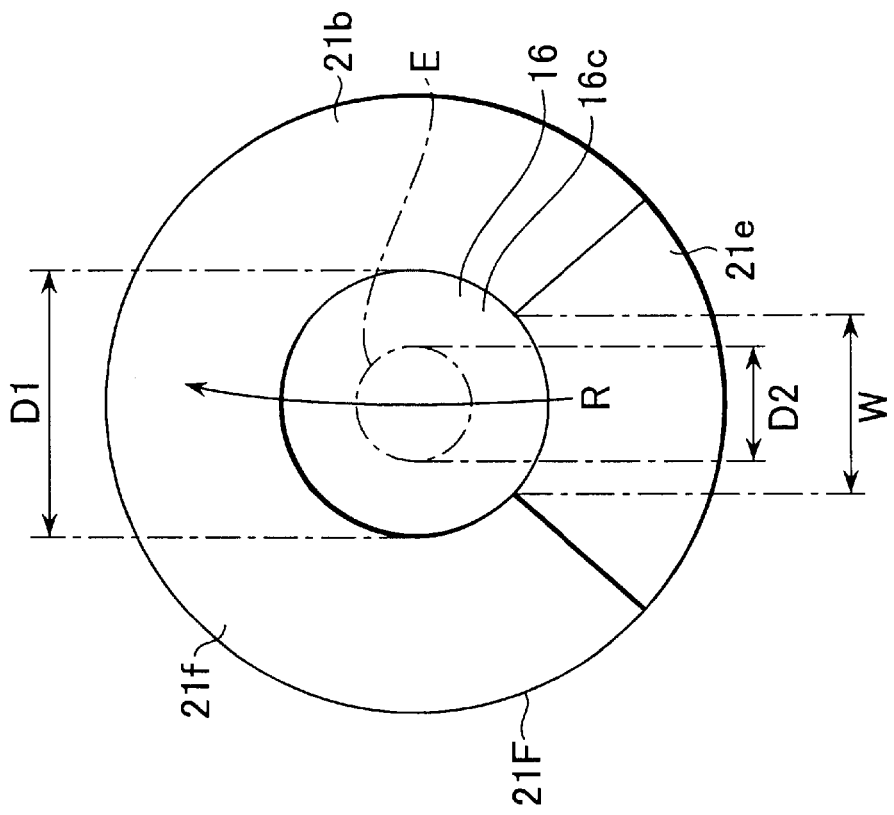

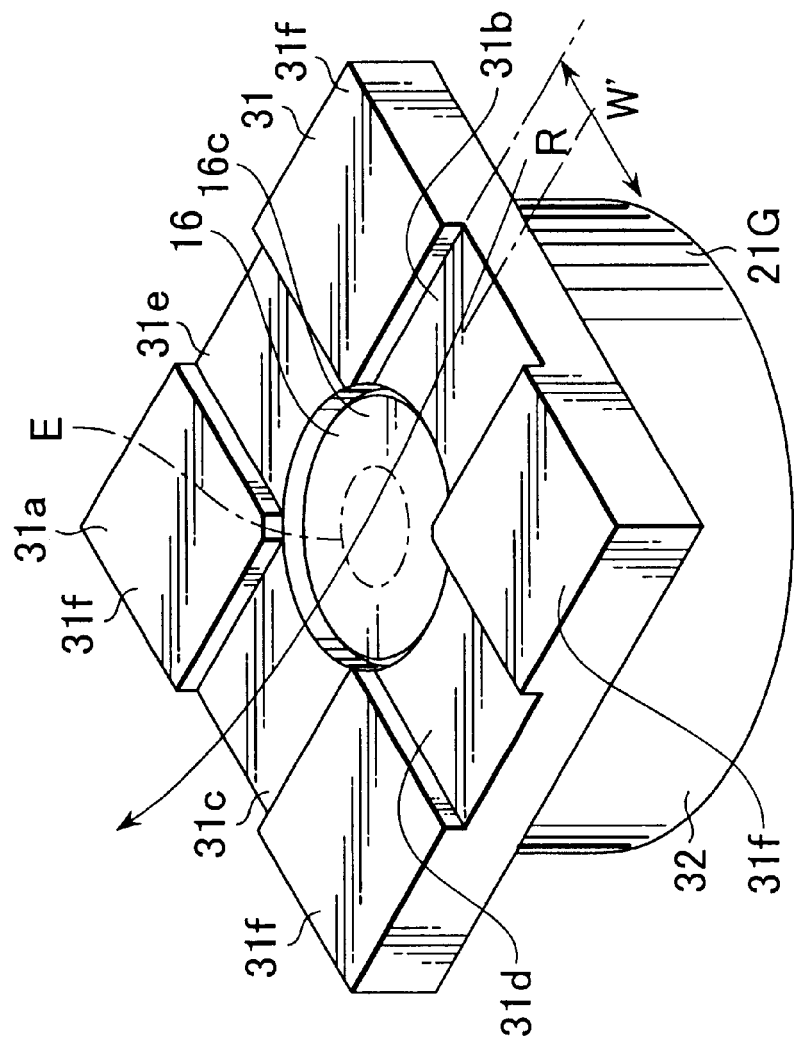

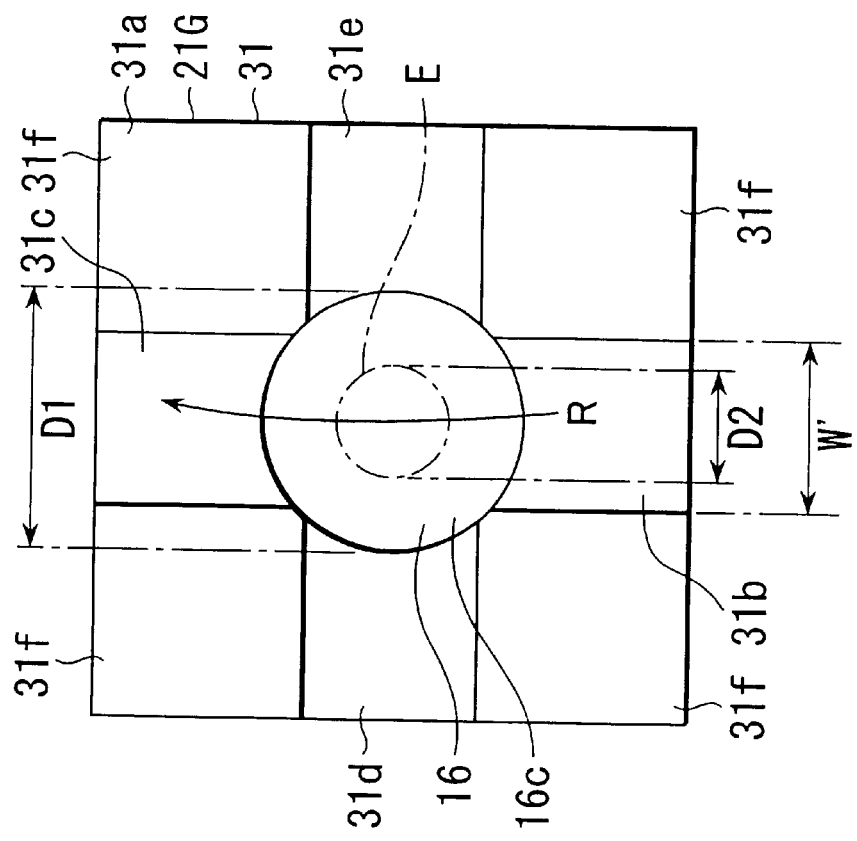

OPTICAL PICKUP APPARATUS AND DISK DRIVE APPARATUS

BACKGROUND OF THE INVENTION

1. Field of the Invention

This invention relates to an optical pickup apparatus and disk drive apparatus, and particularly to the technology for preventing a collision between an optical disk and an objective lens and preventing and reducing damage of a signal recording layer of the optical disk.

2. Description of the Related Art

As a mass storage information recording medium, cited are various optical disks such as CD-ROM (Compact Disk Read Only Memory), CD-R (Compact Disk Recordable), CD-RW (Compact Disk Rewritable), DVD-ROM (Digital Versatile Disk Read Only Memory), DVD-RW (Digital Versatile Disk Rewritable) and other optical reading type disks, a magneto-optical disk, a phase change optical disk and the like.

In a disk drive apparatus for performing recording and/or reproducing to the above optical disks, a focus servo is used for focusing beam light on a signal recording layer of the optical disk, and when the focus servo comes off, an objective lens for focusing the beam light on the signal recording layer of the optical disk and the optical disk collide to damage the optical disk or the objective lens, resulting in the fear that they are disabled from recording and reproducing a signal.

Attempts have been made to dispose a buffer member made of a material having cushioning property such as non-woven fabric, felt or the like in a surface of a lens holder holding the objective lens that is opposite to the optical disk heretofore, whereby when the focus servo comes off, the optical disk collides with the buffer member before it collides with the objective lens so that the objective lens can be prevented from colliding with the optical disk and the optical disc can be prevented from being damaged.

The conventional disk drive apparatus, however, has the problem that dust such as waste thread or the like is scrubbed from the buffer member and scattered in the device to cause a trouble.

In recent years, with the development into mass storage and high density optical disk, a work space, that is, the space between the objective lens and the disk surface with the servo motor kept on running has been decreased so as to increase the risk of a collision between the objective lens and the optical disk.

With the development into mass storage and high density, the thickness of a protective layer covering the signal recording layer of the optical disk has been decreased, resulting in the problem that the signal recording layer of the optical disk is liable to be damaged by the collision between the optical disk and the objective lens.

SUMMARY OF THE INVENTION

The present invention has been made in view of the above circumstances to prevent a collision between an optical disk and an objective lens and prevent and reduce damage of a signal recording layer of the optical disk.

According to an aspect of the invention, an optical pickup apparatus includes an objective lens for applying a light beam to a signal recording layer of an optical disk, a lens holder for supporting the objective lens, and a coating layer formed on the disk side end face of the lens holder, that is, the end face opposite to the optical disk, and the coating layer is formed of a material softer than the optical disc and having favorable slidability, and projected over the objective lens toward the optical disk.

Thus, in the above optical pickup apparatus of the invention, even if a focus servo comes off so that the optical disk and the objective lens approach, the optical disk comes into contact with the coating layer before it collides with the objective lens so as to prevent a collision between the optical disk and the objective lens.

Though the optical disk comes into contact with the coating layer, the coating layer is formed of the material softer than the optical disk and having favorable slidability so that the optical disk goes with a slight damage.

According to another aspect of the invention, the optical pickup apparatus includes an objective lens for applying a light beam to a signal recording layer of an optical disk, a lens holder for supporting the objective lens, a lens protector provided on the lens holder to surround the periphery of the objective lens, and a coating layer formed on the disk side end face of the lens protector, that is, the end face thereof opposite to the optical disk, and the coating layer is formed of a material softer than the optical disk and having favorable slidability and projected from the objective lens toward the optical disk.

Thus, in the above optical pickup apparatus of the invention, even if a focus servo comes off so that the optical disk and the objective lens approach, the optical disk comes into contact with the coating layer before it collides with the objective lens so as to prevent a collision between the optical disk and the objective lens.

Although the optical disk comes into contact with the coating layer, the coating layer is formed of the material softer than the optical disk and having favorable slidability so that the optical disk goes with a slight damage.

According to still another aspect of the invention, the optical pickup apparatus includes an objective lens for applying a light beam to a signal recording layer, and a lens holder for supporting the objective lens, the disk side end face of the lens holder, that is, the end face positioned in the periphery of the objective lens opposite to the optical disk is disposed closer to the optical disk than the objective lens, an objective lens protective surface is formed for preventing a collision between the objective lens and the optical disk when the lens holder and the optical disk approach, and in the disk side end face of the lens holder, an objective lens protective surface is not formed at least in a portion with a designated width positioned on the upstream side of the objective lens with respect to the rotation of the optical disk.

Thus, in the above optical pickup apparatus of the invention, even if a focus servo comes off so that the optical disk and the objective lens approach, the optical disk comes into contact with the objective lens protective surface before it collides with the objective lens so as to prevent a collision between the optical disk and the objective lens.

The optical disk comes into surface contact with the objective lens protective surface, so that the optical disk goes with a slight damage.

According to an aspect of the invention, the disk drive apparatus includes an optical pickup apparatus adapted to apply a light beam to a signal recording layer of an optical disk rotated by a disk rotating device, thereby reading and/or recording a signal to the signal recording layer, the optical pickup apparatus includes an objective lens for applying a light beam to the signal recording layer, a lens holder for supporting the objective lens, and a coating layer formed on the disk side end face of the lens holder, that is, the end face thereof opposite to the optical disk, and the coating layer is formed of a material softer than the optical disk and having favorable slidability.

Thus, in the above disk drive apparatus of the invention, even if a focus servo comes off so that the optical disk and the objective lens approach, the optical disk comes into contact with the coating layer before it collides with the objective lens so as to prevent a collision between the optical disk and the objective lens.

Although the optical disk comes into contact with the coating layer, the coating layer is formed of the material softer than the optical disk and having favorable slidability so that the optical disk goes with a slight damage.

According to another aspect of the invention, the optical disk drive apparatus includes an optical pickup apparatus adapted to apply a light beam to a signal recording layer of an optical disk rotated by a disk rotating device, thereby reading and/or recording a signal to the signal recording layer, the optical pickup apparatus includes an objective lens for applying a light beam to the signal recording layer, a lens holder for supporting the objective lens, a lens protector provided on the lens holder to surround the periphery of the objective lens, and a coating layer formed on the disk side end face of the lens protector, that is, the end face thereof opposite to the optical disk, and the coating layer is formed of a material softer than the optical disk and having favorable slidability and projected from the objective lens toward the optical disk.

Thus, in the above disk drive apparatus of the invention, even if a focus servo comes off so that the optical disk and the objective lens approach, the optical disk comes into contact with the coating layer before it collides with the objective lens so as to prevent a collision between the optical disk and the objective lens.

Although the optical disk comes into contact with the coating layer, the coating layer is formed of the material softer than the optical disk and having favorable slidability so that the optical disk goes with a slight damage.

According to still another aspect of the invention, the disk drive apparatus includes an optical pickup apparatus adapted to apply a light beam to a signal recording layer of an optical disk rotated by a disk rotating device, thereby reading and/or recording a signal to the signal recording layer, the optical pickup apparatus includes an objective lens for applying a light beam to the signal recording layer, and a lens holder for supporting the objective lens, the disk side end face of the lens holder, that is, the end face positioned in the periphery of the objective lens opposite to the optical disk is disposed closer to the optical disk than the objective lens, an objective lens protective surface is formed for preventing a collision between the objective lens and the optical disk when the lens holder and the optical disk approach, and in the disk side end face of the lens holder, an objective lens protective surface is not formed at least in a portion with a designated width positioned on the upstream side of the objective lens with respect to the rotation of the optical disk.

Thus, in the above disk drive apparatus of the invention, even if a focus servo comes off so that the optical disk and the objective lens approach, the optical disk comes into contact with the objective lens protective surface before it collides with the objective lens so as to prevent a collision between the optical disk and the objective lens.

The optical disk comes into face contact with the objective lens protection surface, so that the optical disk goes with a slight damage.

BRIEF DESCRIPTION OF THE DRAWINGS

Preferred embodiments of the present invention will be described in detail based on the followings, wherein

FIG. 22 is a plan view of the seventh embodiment;

FIG. 23 is a perspective view showing an eighth embodiment with FIG. 24; and

FIG. 24 is a plan view of the eighth embodiment.

DESCRIPTION OF THE PREFERRED EMBODIMENTS

Figure 1:
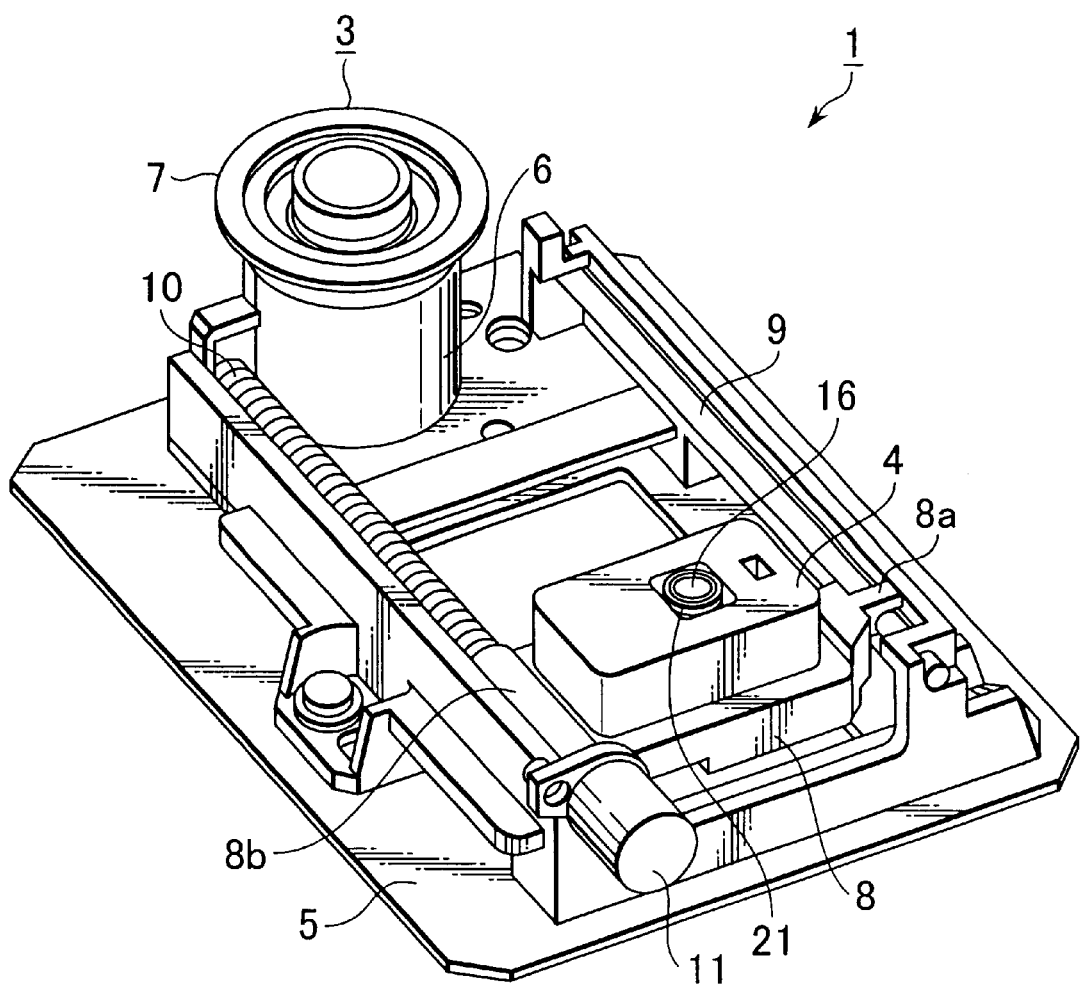
FIG. 1 is a schematic perspective view showing an outline of an embodiment of a disk drive apparatus according to the invention.

FIG. 1 is a schematic diagram showing the first embodiment of a disk drive apparatus 1. The disk drive apparatus is adapted to record and/or reproduce a signal to and from an optical disk 2, and provided with a disk rotating device 3 and an optical pickup apparatus 4.

As the optical disk 2, cited are various optical disks such as CD-ROM (Compact Disk Read Only Memory), CD-R (Compact Disk Recordable), CD-RW (Compact Disk Rewritable), DVD-ROM (Digital Versatile Disk Read Only Memory), DVD-RW (Digital Versatile Disk Rewritable) and other optical reading type disks, a magneto-optical disk, a phase change optical disk and the like, and it does not matter in the invention what the system and size are like.

The disk drive apparatus 1 includes a device capable of both reproducing and recording in addition to the device special for reproduction or recording, and it does not matter whether it is stationary or portable in its operating form.

In the disk drive apparatus 1, the optical disk 2 is rotated by the disk rotating device 3, and a signal is recorded and/or read to and from the optical disk 2 by the optical pickup apparatus 4 moving in the radial direction of the rotating optical disk 2.

The disk rotating device 3 is provided with a spindle motor 6 disposed on a chassis 5 and a turntable 7 rotated by the spindle motor 6, and the optical disk 2 is rotated in the state of being held on the turntable 7.

The optical pickup apparatus 4 is constructed on a slide base 8, and the slide base 8 is freely moved in the radial direction of the optical disk 2 held on the turntable 7 by a guide shaft 9 and a feed screw 10 provided on the turntable 7. That is, one end part 8a of the slide base 8 is freely slidably engaged with the guide shaft 9, and the other end part 8b of the slide base 8 is screw-engaged with the feed screw 10. The feed screw 10 is rotated by a feed motor 11, and the rotation of the feed screw 10 causes the other end part 8b of the slide base 8 to be fed in the axial direction of the feed screw 10, that is, the radial direction of the optical disk 2 on the turntable 7, whereby the one end part 8a of the slide base 8 is also slid in the same direction so that the optical pickup apparatus 4 is moved in the radial direction of the optical disk 2 on the turntable 7.

Though FIG. 1 shows an example of a mechanism for feeding the optical pickup apparatus 4 in the radial direction of the optical disk 2 on the turntable 7, the mechanism for feeding the optical pickup apparatus 4 in the radial direction of the optical disk 2 on the turntable 7 is not limited to the mechanism shown in FIG. 1.

Figure 2:
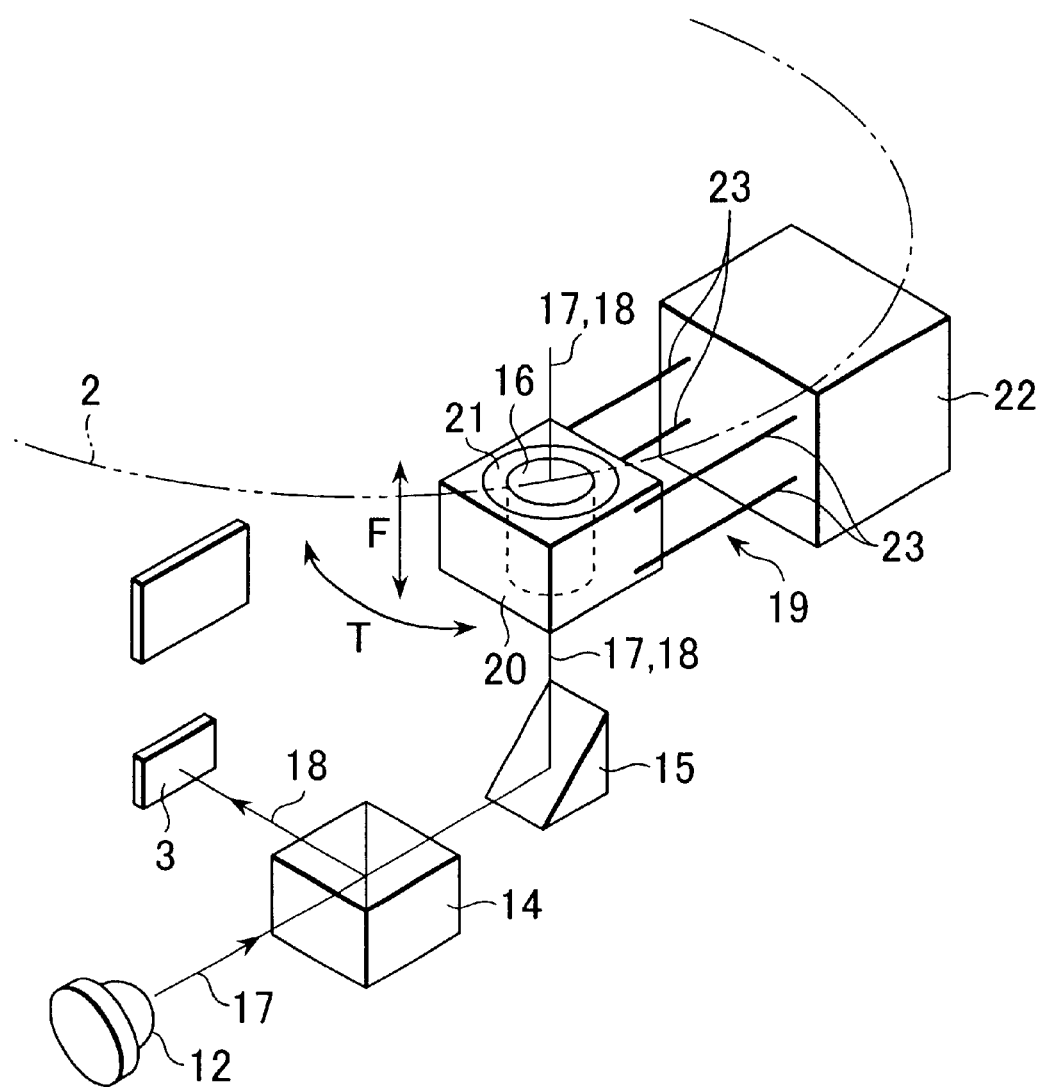
FIG. 2 is a schematic perspective view showing an outline of configuration of an optical pickup apparatus.

FIG. 2 is a schematic diagram showing the constitution of the optical pickup apparatus 4.

The optical pickup apparatus 4 includes a laser light source 12 such as a semiconductor laser, a photo detector 13, a beam splitter 14, a mirror 15, and an objective lens 16.

A laser beam 17 outputted from the laser light source 12 is transmitted through the beam splitter 14, and with the optical path raised at 90 degrees by the mirror 15, condensed on a signal recording layer 2a of the optical disk 2. A reflected laser beam 18 reflected by the signal recording layer 2a of the optical disk 2 is reflected by the beam splitter 14 through the objective lens 16 and the mirror 15 to be detected by the photo detector 13. A focus error signal and a tracking error signal are obtained by detecting the reflected laser beam 18 by the photo detector 13, and in reproducing, a reproduction signal is obtained. The reproduction signal is processed to read (reproduce) a signal recorded in the signal recording layer 2a of the optical disk 2.

The objective lens 16 is supported and controlled by a biaxial actuator 19 to move in the focusing direction, that is, in the direction of approaching to and separating from the signal recording layer 2a of the optical disk 2 held on the turntable 7 and tracking direction, that is, in the direction parallel to the signal recording layer 2a of the optical disk 2 held on the turntable 7.

The biaxial actuator 19 includes a movable part 20, and the objective lens 16 is supported on the movable part 20 through a lens holder 21. The movable part 20 is supported on the slide base 8 to freely move in the focusing direction (See an arrow F in FIG. 2) and in the tracking direction (See an arrow T in FIG. 2) through suspensions 23, 23 . . . formed by a fine elastic wire rod provided on a stationary support part 22. A magnetic circuit not shown is formed in the biaxial actuator 19, and according to the focusing error signal and the tracking error signal obtained from the above photo detector 13, the above magnetic circuit is driven, whereby the movable part 20 is caused to move in the focusing direction and in the tracking direction, the laser beam 17 irradiating the signal recording layer 2a of the optical disk 2 is controlled to trace a recording track formed in the signal recording layer 2a or a guide groove, and be focused on the recording track or the guide groove by the objective lens 16.

The constitution of the optical pickup apparatus 4 shown in FIG. 2 is basic, and it may be altered in various ways. For examples, instead of providing the laser light source 12 and the photo detector 13 separately, a laser coupler having a laser light source and a photo detector packaged in a body may be used, or optical elements other than the above may be interposed in an optical path extending from the laser light source through the optical disk to the photo detector.

The invention is characterized by the lens holder 21 holding the objective lens 16.

Figure 3:
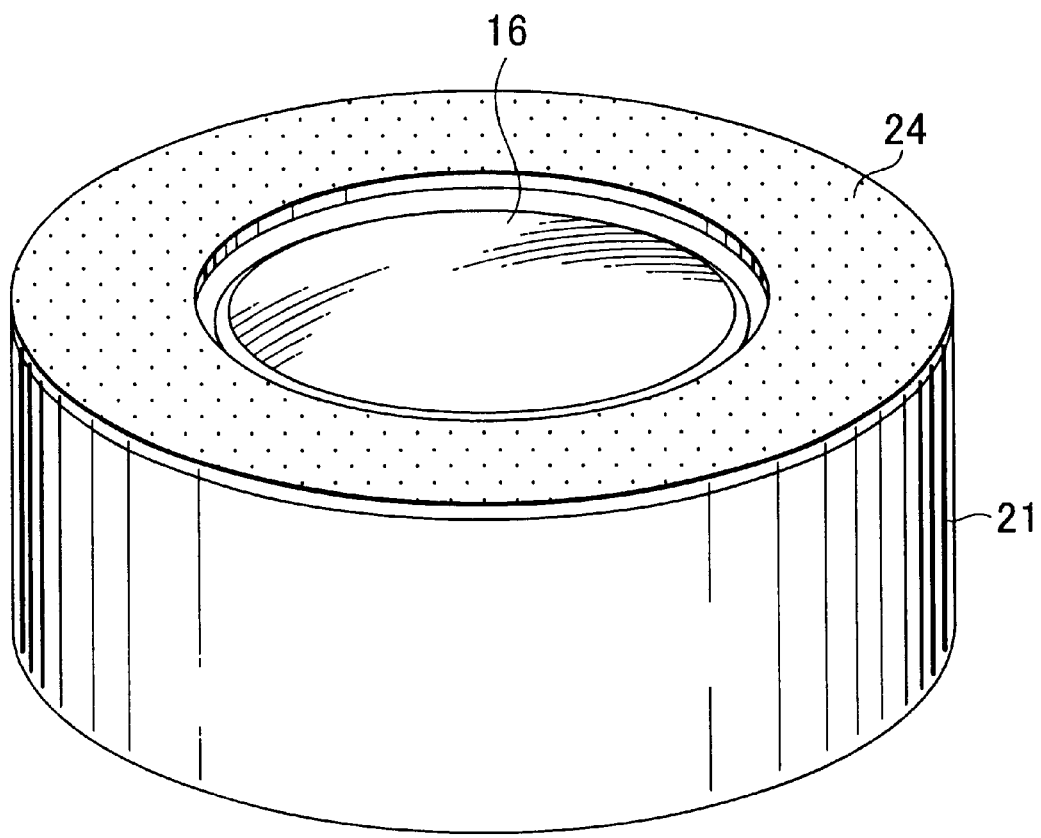
FIG. 3 is a perspective view of the principal part, which shows a first embodiment with FIG. 4.
Figure 4:
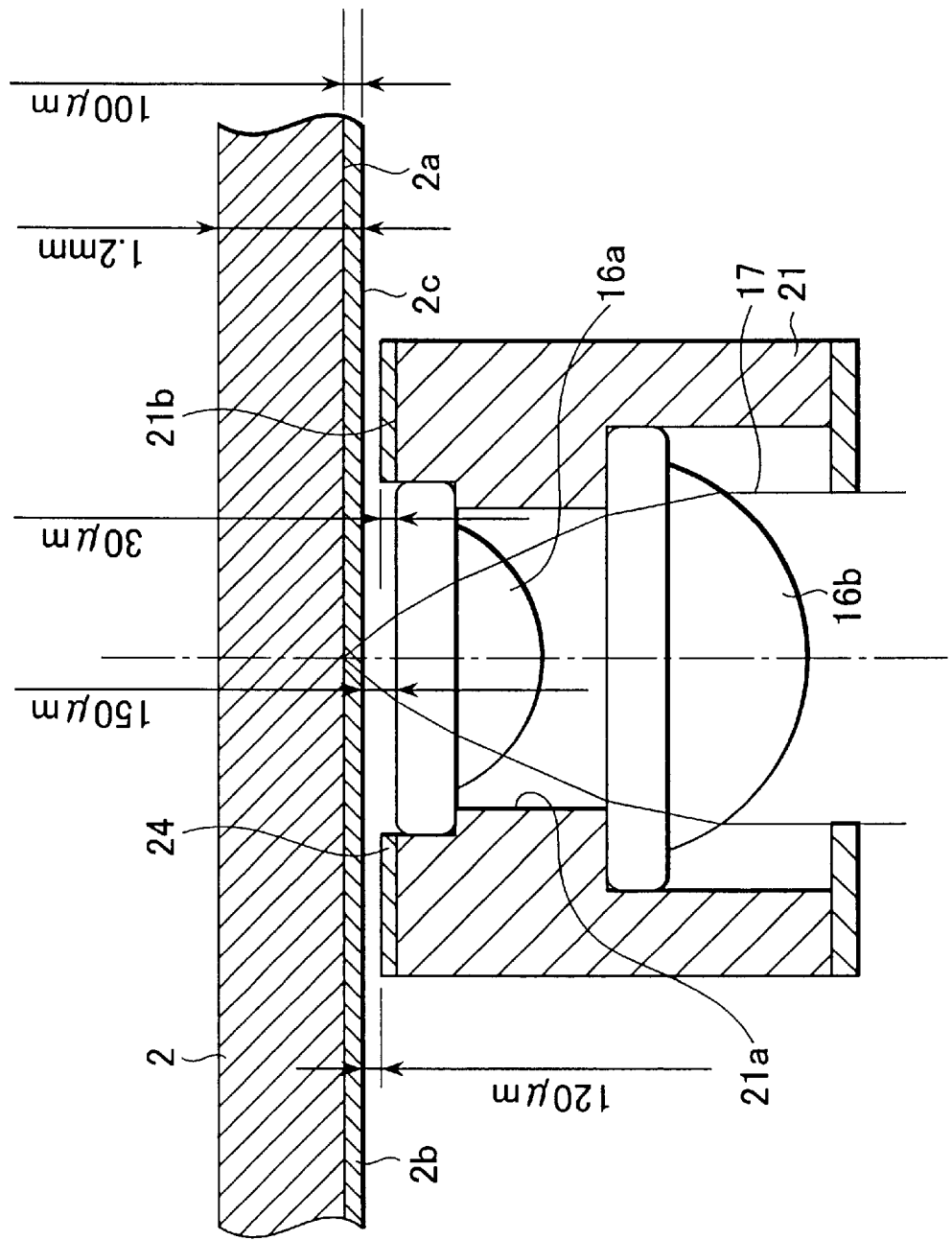
FIG. 4 is a longitudinal section of the principal part.

FIGS. 3 and 4 show the first embodiment.

The lens holder 21 is formed of synthetic resin such as ABS resin substantially cylindrical. The objective lens 16 is held in a center hole 21a of the lens holder 21. The objective lens 16 is of a two-piece structure composed of a front lens 16a and a rear lens 16b in order to enlarge an aperture diameter (See FIG. 4).

A coating layer 24 is formed on the disk side end face of the lens holder 21, that is, the end face 21b opposite to the optical disk. The coating layer 24 is formed of a material softer than the optical disk 2 and having favorable slidability. As such a coating material for forming the coating layer, considered is fluorocarbon resin coating material mainly composed of fluorocarbon resin. The coating layer 24 is projected over the front lens 16a of the objective lens 16 toward the optical disk 2.

According to the first embodiment, the coating layer 24 formed on the disk side end face 21b of the lens holder 21 is projected over the objective lens 16 toward the optical disk 2, whereby even if a focus servo comes off, the coating layer 24 comes into contact with the optical disk 2 before the objective lens 16 collides with the optical disk 2 so as to prevent the objective lens 16 from being damaged, and the optical disk 2 comes into contact with the coating layer 24 formed of the material softer than the optical disk 2 and having favorable slidability so that the optical disk 2 is hardly damaged to decrease the risk of being disabled from reading a signal due to a collision.

Figure 5:
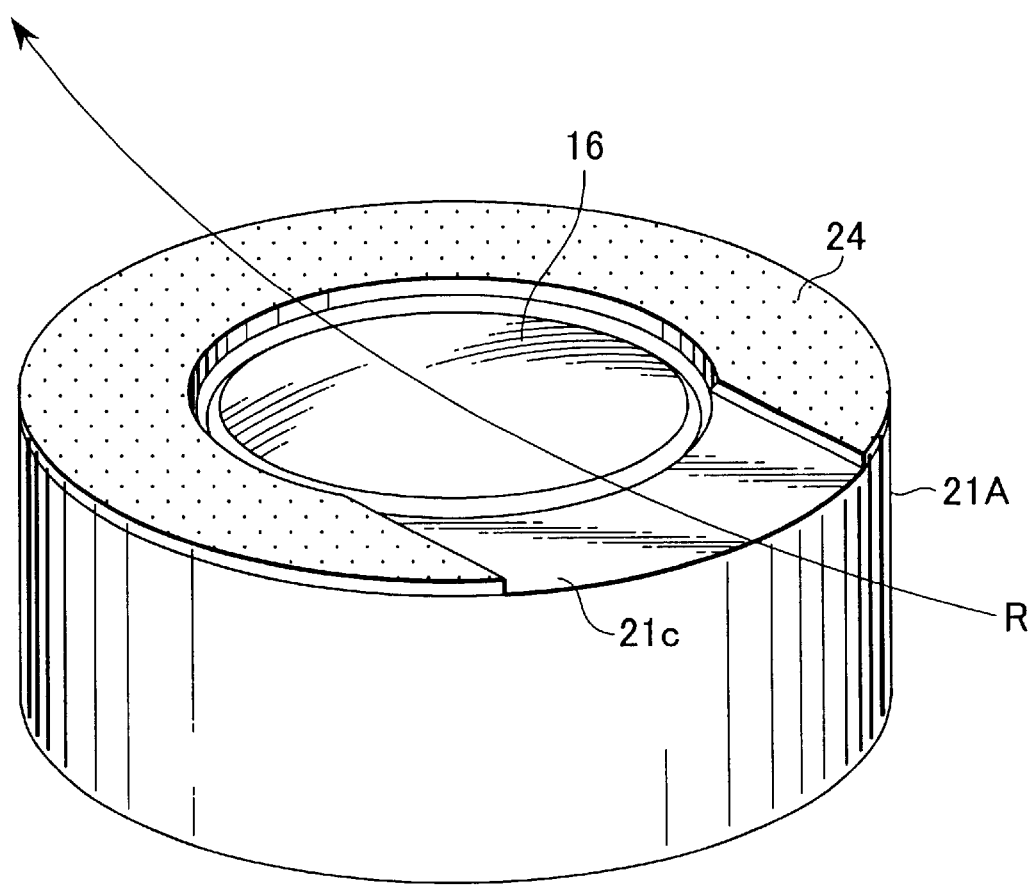
FIG. 5 is a schematic perspective view of the principal part showing a second embodiment.

FIG. 5 shows the second embodiment of the invention.

According to the second embodiment, in the lens holder 21A, the above coating layer 24 is formed outside of a portion 21c (hereinafter referred to as stepped surface) in the disk side end face 21b that is positioned on the upstream side of the objective lens 16 with respect to the rotation (the rotating direction is indicated by an arrow R) of the optical disk 2. The coating layer 24 is projected over the front lens 16a of the objective lens 16 toward the optical disk 2.

Figure 6A:
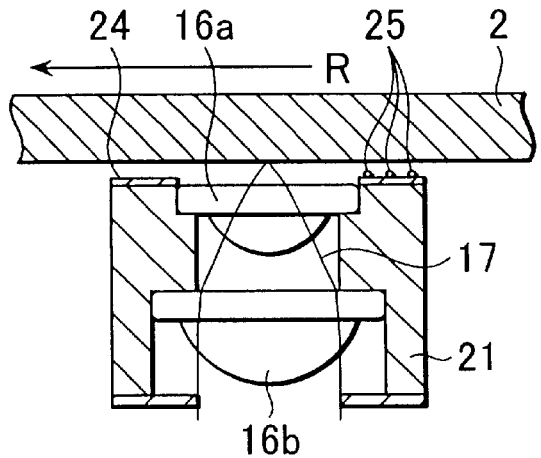
FIG. 6, consisting of FIGS. 6A, 6B, 6C, is a sectional view of the principal part showing the problems of the first embodiment, which explains the effects of the second embodiment with FIG. 7.
Figure 6B:
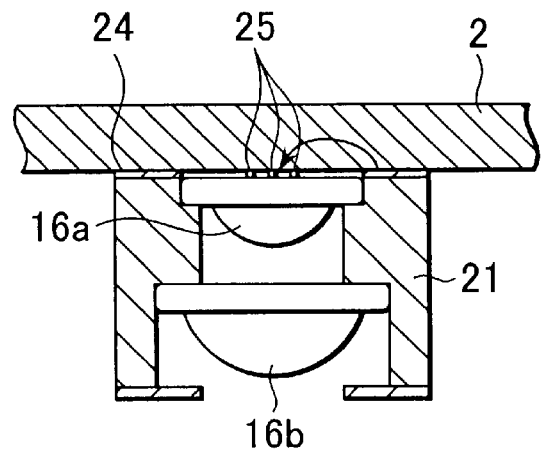
Figure 6C:
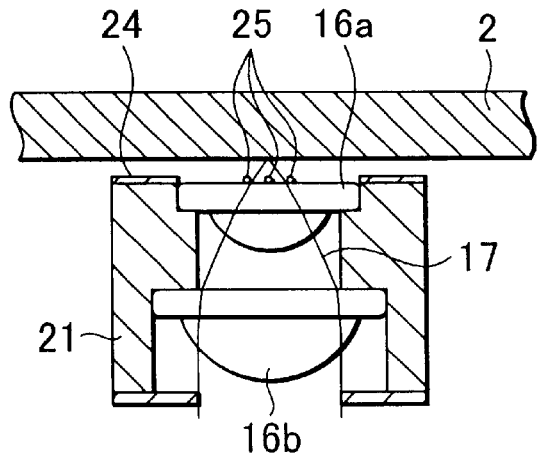
Figure 7A:
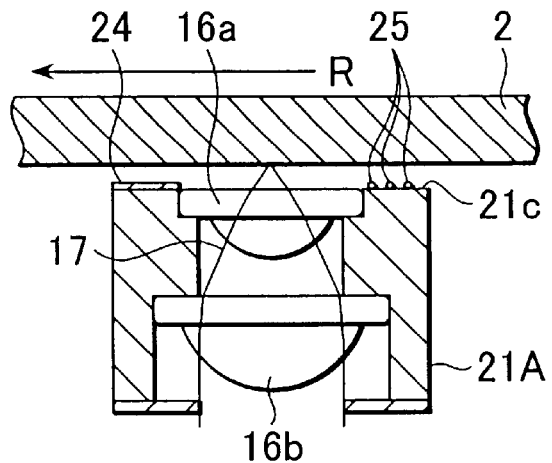
FIG. 7, consisting of FIGS. 7A, 7B, and 7C, is a sectional view of the principal part for explaining the advantages of the second embodiment.

The significance of forming the stepped surface 21c will be described by FIGS. 6 and 7.

In the lens holder without the stepped surface 21c, that is, the lens holder 21 of the first embodiment shown in FIGS. 4 and 5, in the case where there are dust and the like (shavings of the optical disk 2 and the coating layer 24 caused by a collision between the optical disk 2 and the coating layer 24, and dust) 25, 25, . . . in a portion of the coating layer 24 positioned on the upstream side of the objective lens 16 with respect to the rotation of the optical disk 2 (See FIG. 6A), when a focus servo comes off so that the optical disk 2 is approaching to the objective lens 16, the optical disk 2 collides with the coating layer 24 and the dust and the like 25, 25, . . . on the coating layer 24 are blown off to the downstream side of the rotation of the optical disk 2. Since the place of the dust and the like 25, 25, . . . is located rather closer to the optical disk 2 than the objective lens 16, the blown-off dust and the like 25, 25, . . . are put on the objective lens 16 (See FIG. 6B) so that the dust and the like 25, 25, . . . shield the laser beam 17 transmitted through the objective lens 16 (See FIG. 6C) to be an obstacle to reading and/or recording a signal.

Figure 7B:
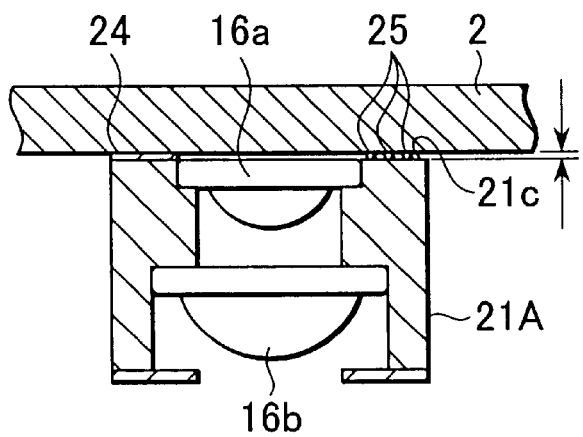
Figure 7C:
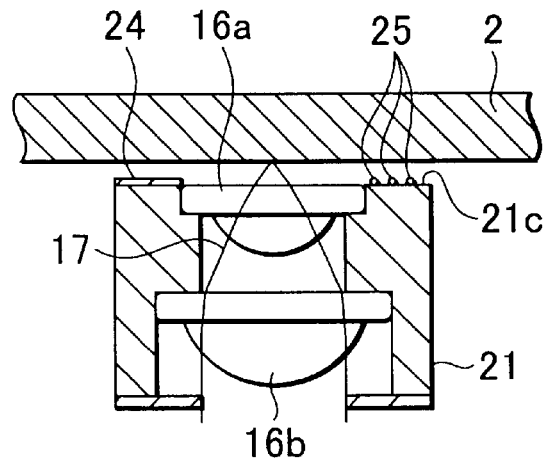

According to the second embodiment, however, the stepped surface 21c is provided on a portion corresponding to the upstream side of the objective lens 16 with respect to the rotation of the optical disk 2, and the stepped surface 21c is located more distant from the optical disk 2 than the coating layer 24, so that the dust and the like 25, 25 . . . are put on the stepped surface 21c (See FIG. 7A), whereby even if the focus servo comes off so that the optical disk 2 approaches to the objective lens 16 to collide with the coating layer 24, the stepped surface 21c on which the dust and the like 25, 25, . . . are put is located more distant from the optical disk 2 than the coating layer 24, so that the dust and the like 25, 25, . . . are prevented from being blown off to the downstream side of the rotation of the optical disk 2 (See FIG. 7B). Accordingly, the dust and the like 25, 25, . . . will not shield the laser beam 17 transmitted through the objective lens 16 (See FIG. 7C).

Figure 8:
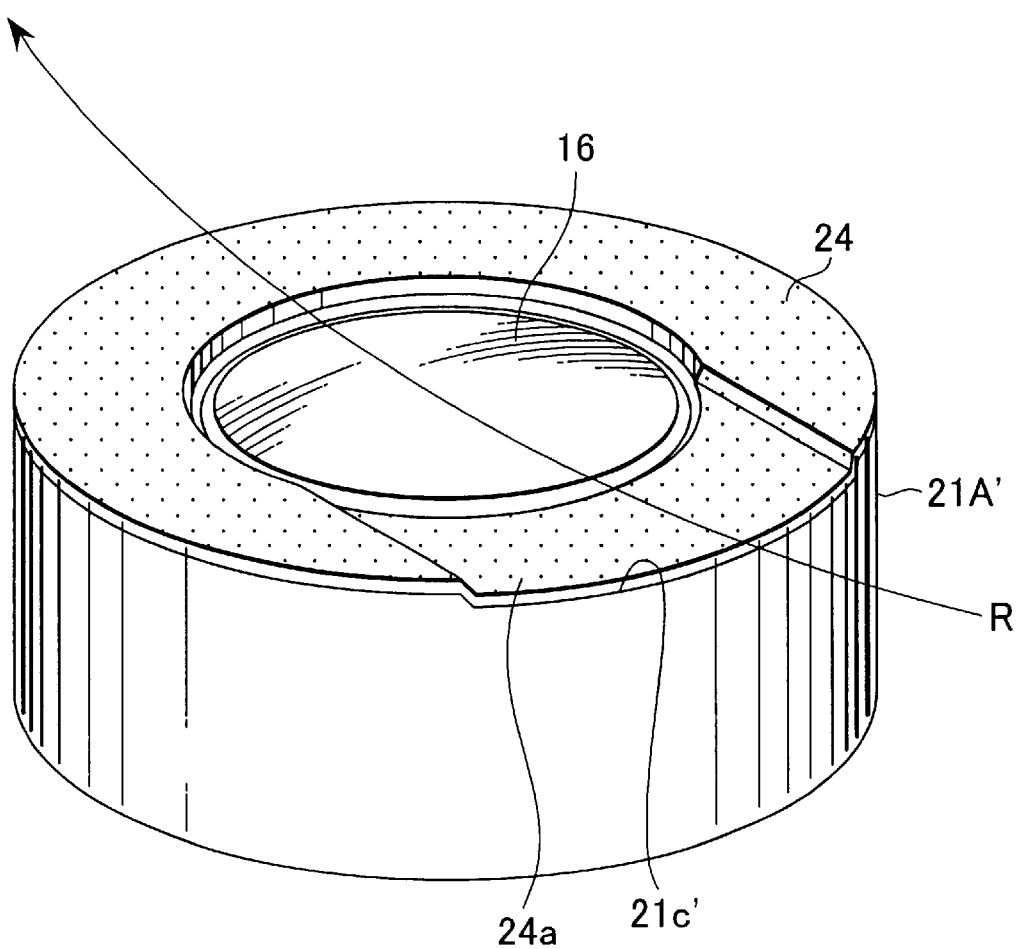
FIG. 8 is a schematic perspective view of the principal part showing a modified form of the second embodiment.

FIG. 8 shows a modified form of the second embodiment.

In the lens holder 21A' of this modified form, a portion 21c' of the disk side end face positioned on the upstream side of the objective lens 16 with respect to the rotation of the optical disk 2 is formed as a stepped surface located more distant from the optical disk 2 than the other portion, and the coating layer 24 is formed on the whole of the disk side end face of the lens holder 21A'. Whereupon, a portion 24a of the coating layer 24, which is formed on the stepped surface 21c', is located more distant from the optical disk 2 than that in the other portion. Thus, the same effect as in the lens holder 21A of the second embodiment is produced.

In this modified form, masking is not needed for partially providing the coating layer 24 so as to facilitate formation of the coating layer 24.

Figure 9:
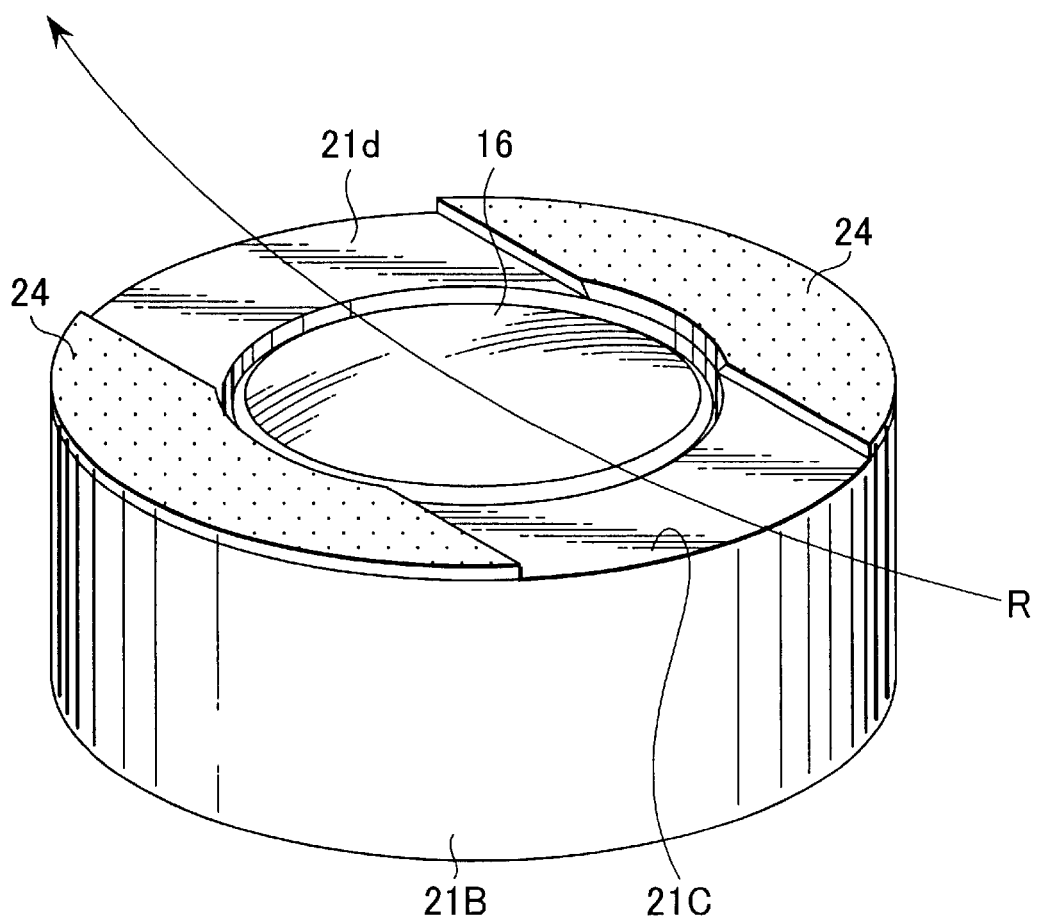
FIG. 9 is a schematic perspective view of the principal part showing a third embodiment.

FIG. 9 shows the third embodiment.

In the lens holder 21B of the third embodiment, the coating layers 24, 24 are formed on the disk side end face 21b outside of a portion 21c (stepped surface) positioned on the upstream side of the objective lens 16 and a portion 21d (hereinafter referred to as downstream stepped surface) positioned on the downstream side with respect to the rotation (the rotating direction is indicated by an arrow R) of the optical disk 2. The coating layers 24, 24 are projected over the front lens 16a of the objective lens 16 toward the optical disk 2.

Figure 10A:
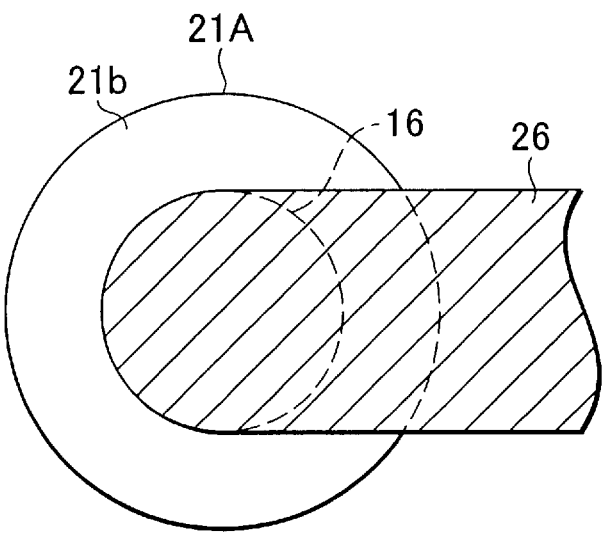
FIG. 10, consisting of FIGS. 10A and 10B, is a schematic plan view showing an example of masking in the case of forming a coating layer.
Figure 10B:
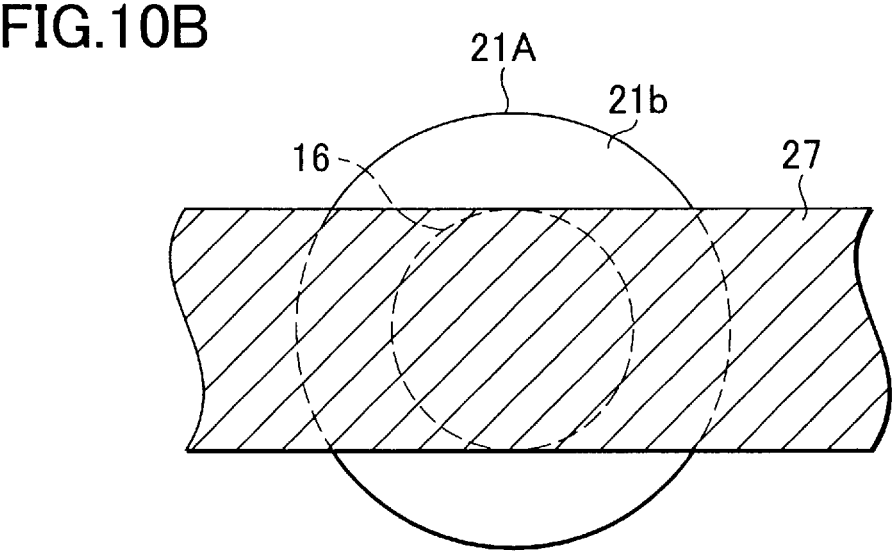

In the lens holder 21B of the third embodiment, although the upstream stepped surface 21c produces the same effect as in the second embodiment, the downstream stepped surface 21d does not have a special function. In the case of partially forming the coating layer 24 on the disk side end face 21b of the lens holder 21B, however, normally masking technology is applied, and the application of masking 27 (See a hatched portion of FIG. 10B) extending from the upstream stepped surface 21c through the objective lens 16 to the downstream stepped surface 21d requires lower accuracy than the application of masking 26 (See a hatched portion of FIG. 10A) covering the upstream stepped surface 21c and the objective lens 16, so that the cost of forming the coating layer 24 can be reduced. A smaller quantity of coating material to be used will be sufficient. In the effect of the coating layers 24, 24 for preventing a collision between the optical disk 2 and the objective lens 16 and reducing the damage of the optical disk 2 in a collision, there is no difference from the lens holders of the first embodiment and the second embodiment.

Figure 11:
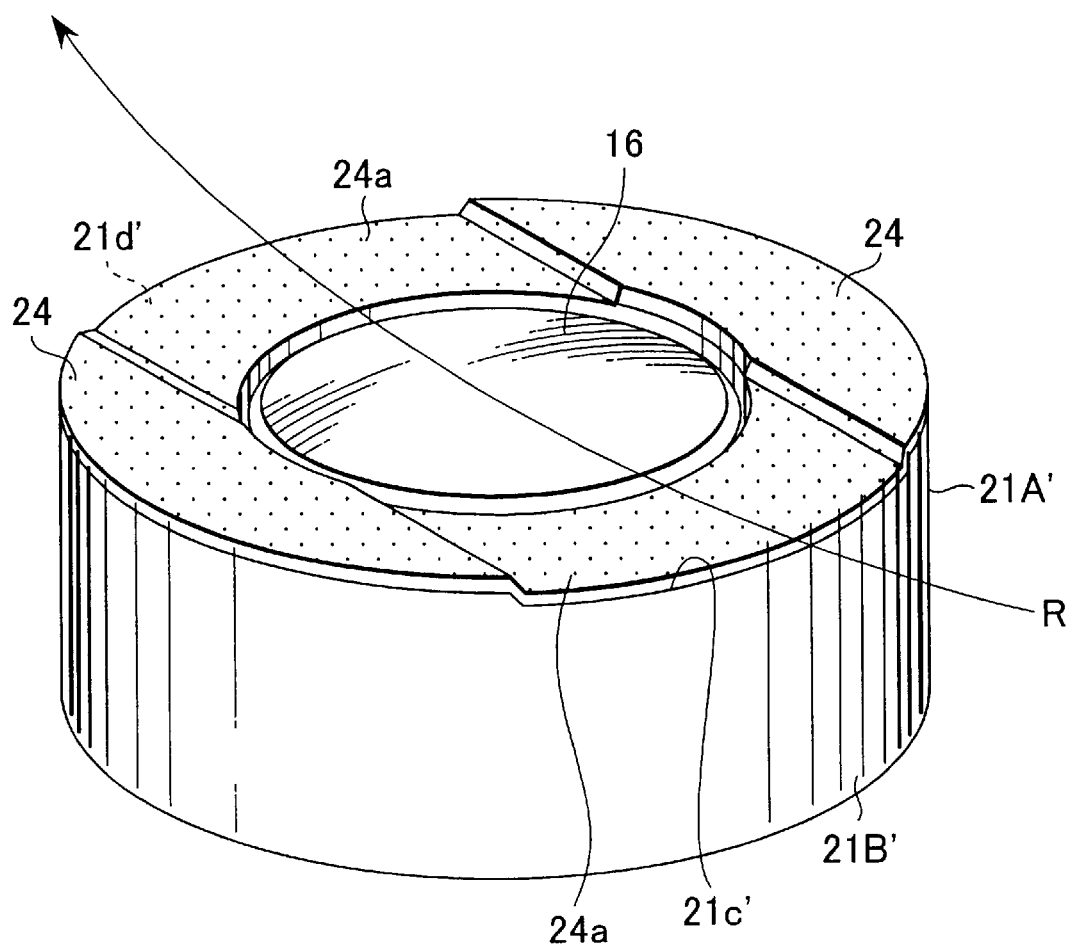
FIG. 11 is a schematic perspective view of the principal part showing a modified form of the third embodiment.

FIG. 11 shows a modified form of the third embodiment.

In the lens holder 21B' of this modified form, a portion 21c' (stepped surface) positioned on the upstream side of the objective lens 16 and a portion 21d' (hereinafter referred to as downstream stepped surface) positioned on the downstream side with respect to the rotation of the optical disk 2 in the disk side end face 21b are formed as a stepped surface located more distant from the optical disk 2 than the other portion, and the coating layer 24 is formed on the whole of the disk side end face of the lens holder 21B'. Whereupon, the portions 24a, 24a of the coating layer 24, which are formed on the stepped surfaces 21c', 21d', are located more distant from the optical disk 2 than that in the other portion. Thus, the same effect as in the lens holder 21B of the third embodiment is produced.

In this modified form, masking for partially providing the coating layer 24 is not needed so as to facilitate formation of the coating layer 24.

Figure 12:
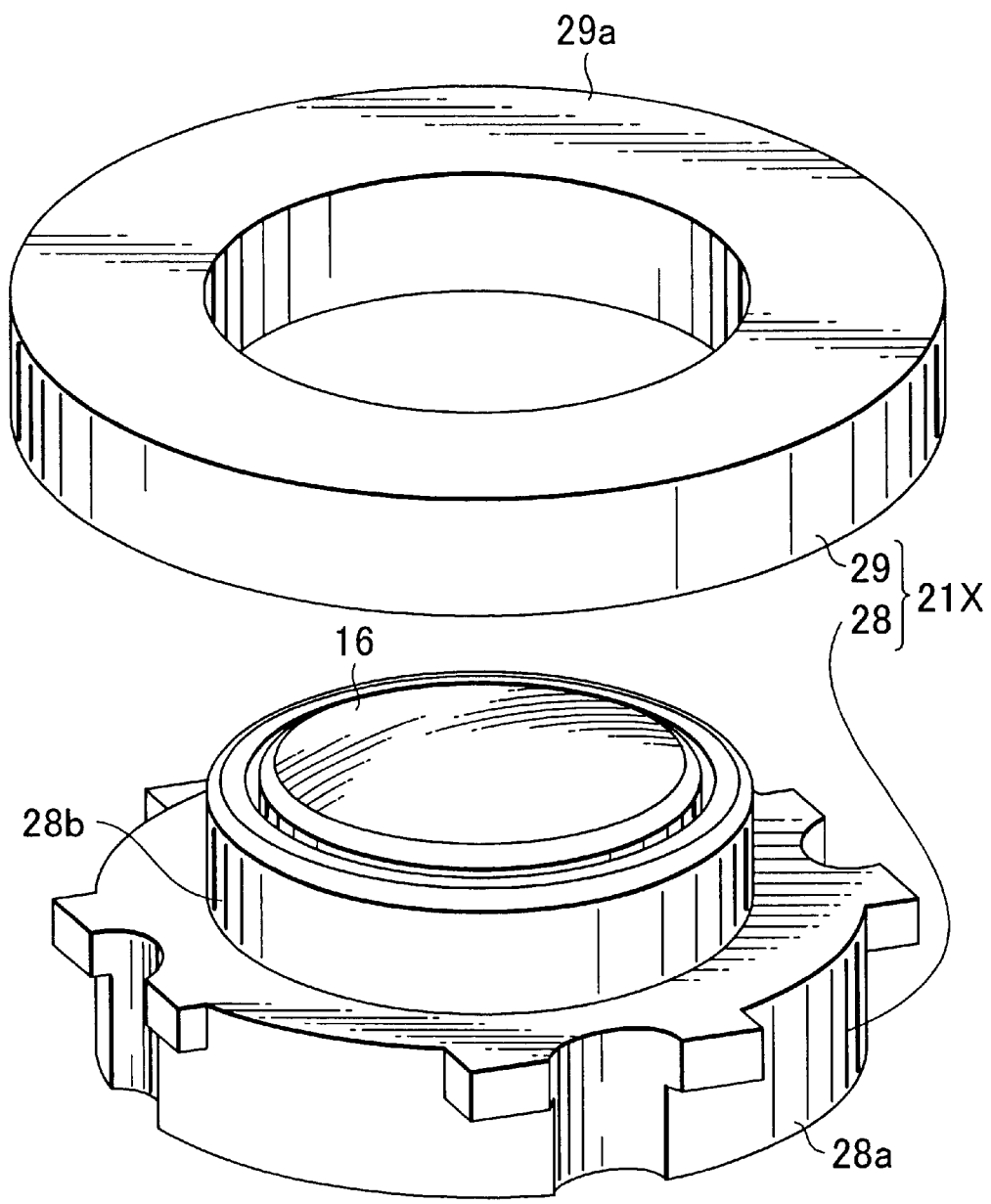
FIG. 12 is an exploded perspective view showing a lens holder which originates a fourth embodiment with FIG. 13.
Figure 13:
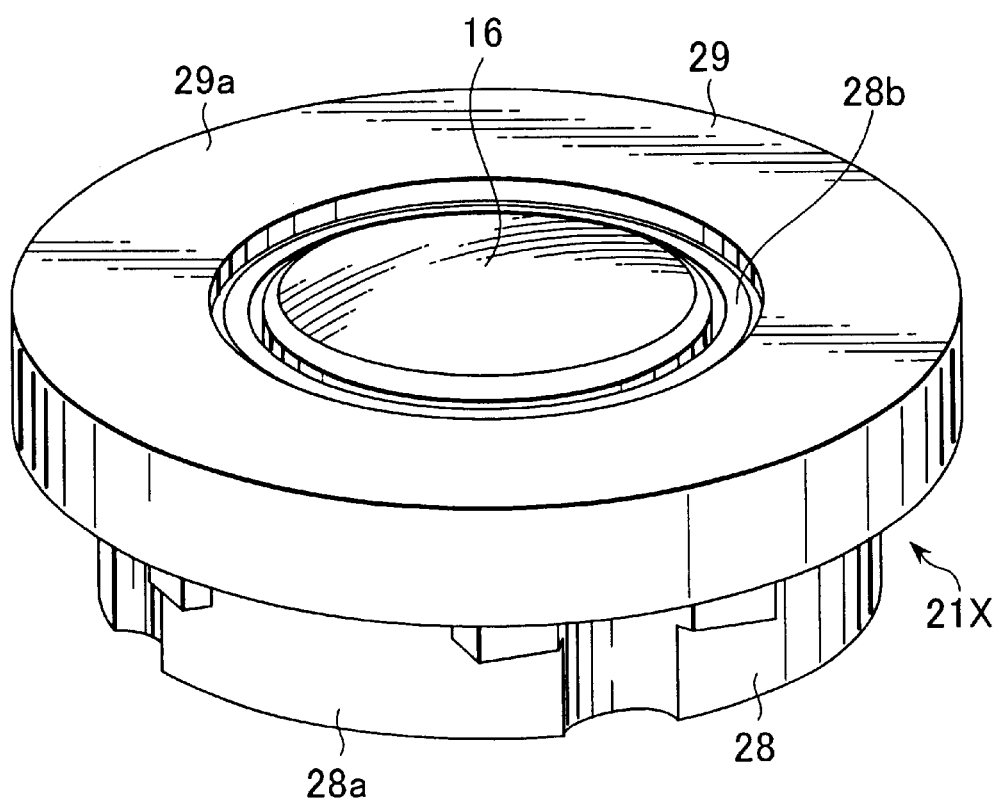
FIG. 13 is a perspective view of the lens holder.

FIGS. 12 and 13 show the lens holders which originate the fourth embodiment of the invention.

The lens holder 21X is constituted by a holder main body 28 and a lens protector 29.

The holder main body 28 is constituted by a large diameter part 28a and a small diameter part 28b connected to the upper side of the large diameter part 28a, and the outline of the small diameter part 28b is circular. The objective lens 16 (the front lens 16a and the rear lens 16b) is supported in a central hole 28c penetrating the central part of the holder main body 28.

The lens protector 29 is annular, and the inside diameter is set a little larger than the outside diameter of the small diameter part 28b of the holder main body 28. The lens protector 29 is fixed to the holder main body 28 in the state of being externally fitted to the small diameter part 28b thereof by bonding or the like. With the lens protector 29 fixed to the holder main body 28, the disk side end face 29a of the lens protector 29 is projected over the objective lens 16 (to be concrete, the disk side end face of the front lens 16a) toward the optical disk 2.

The collision resisting characteristics can be remarkably improved by using the lens holder 21X adopting the above structure and having the lens protector 29 formed of fluorocarbon resin as compared with the conventional one. On measuring the number of signal reading errors after 1000 collisions between the optical disk and the objective lens in the conventional one, the signal can be hardly read. In the case of adopting the lens protector 29 formed of fluorocarbon resin, reading does not become impossible, though a signal reading error is found. The measurement on the number of signal reading errors after the collision will be described later in detail.

Figure 14:
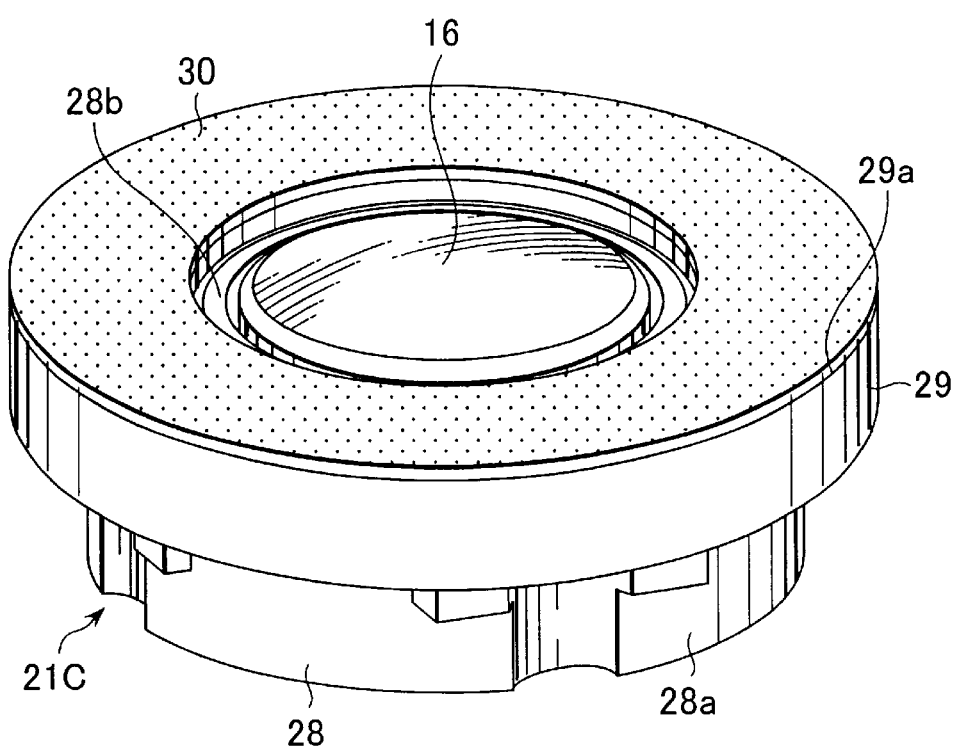
FIG. 14 is a perspective view showing the fourth embodiment with FIG. 15.
Figure 15:
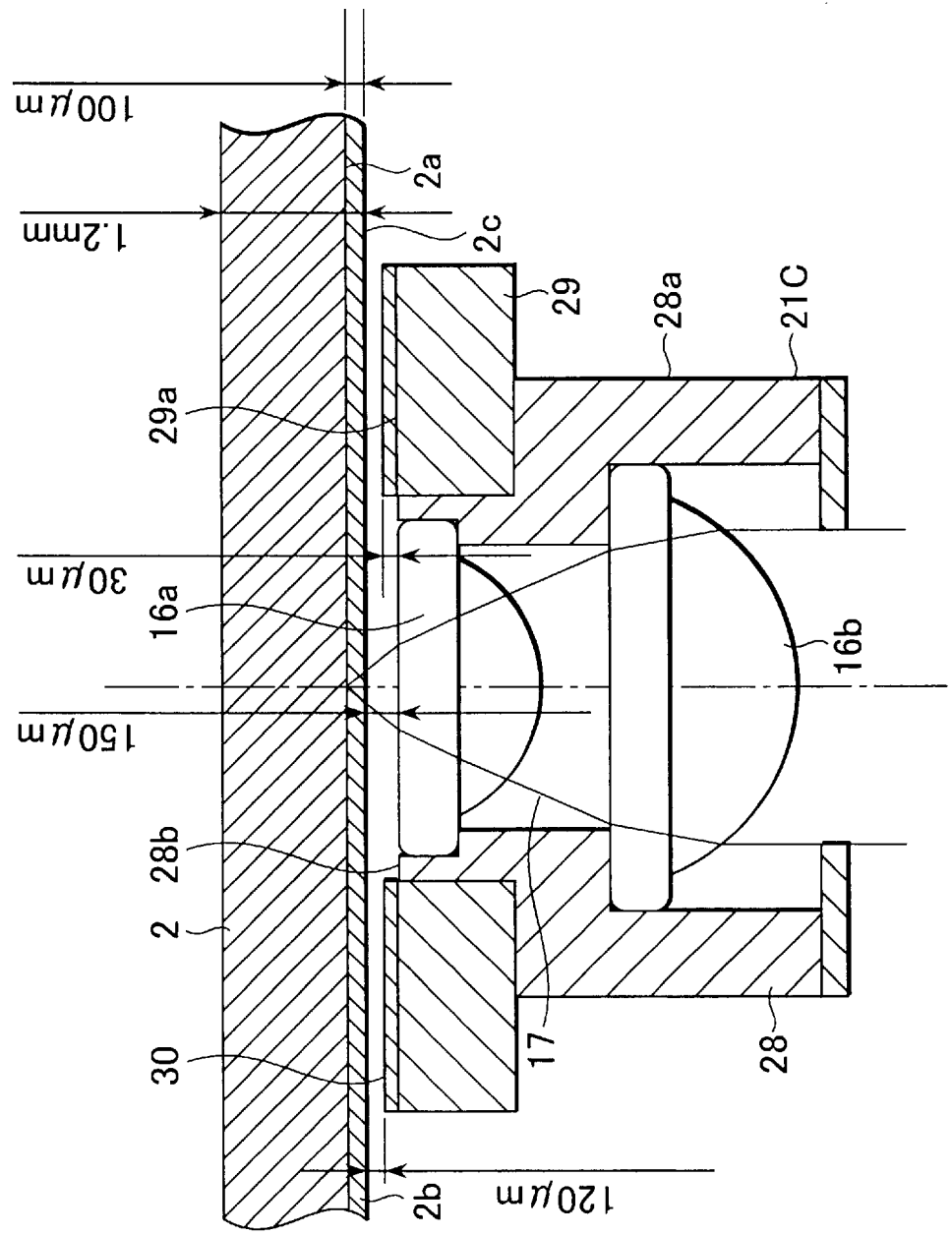
FIG. 15 is a longitudinal section of the above.

FIGS. 14 and 15 show the fourth embodiment.

The lens holder 21C of the fourth embodiment basically has the structure shown in FIGS. 12 and 13, and a coating layer 30 is formed on the disk side end face 29a of the lens protector 29. The coating layer 30 is formed of a material softer than the optical disk 2 and having favorable slidability. As a coating material for forming such a coating layer 30, considered is a fluorocarbon resin coating material mainly composed of fluorocarbon resin. The coating layer 30 is projected over the front lens 16a of the objective lens 16 toward the optical disk 2.

The disk side end face 29a of the lens protector 29 is projected over the front lens 16a of the objective lens 16 toward the optical disk 2 in the lens holder 21X shown in FIGS. 12 and 13, in the lens holder 21C of the fourth embodiment; however, it is not necessary that the disk side end face 29a of the lens protector 29 is projected over the front lens 16a of the objective lens 16 toward the optical disk 2, but it will be sufficient that the coating layer 30 formed on the disk side end face 29a is projected over the front lens 16a of the objective lens 16 toward the optical disk 2.

In the fourth embodiment, the coating layer 30 formed on the disk side end face 29a of the lens protector 29 of the lens holder 21C is projected over the objective lens 16 toward the optical disk 2, whereby when the focus servo comes off, the coating layer 30 collides with the optical disk 2 before the objective lens 16 collides with the optical disk 2, so that the objective lens 16 is prevented from being damaged, and also the optical disk 2 collides with the coating layer 30 formed of a material softer than the optical disk 2 and having favorable slidability so that the optical disk 2 is hardly damaged to decrease the risk of being disabled from reading a signal due to the collision.

Figure 16:
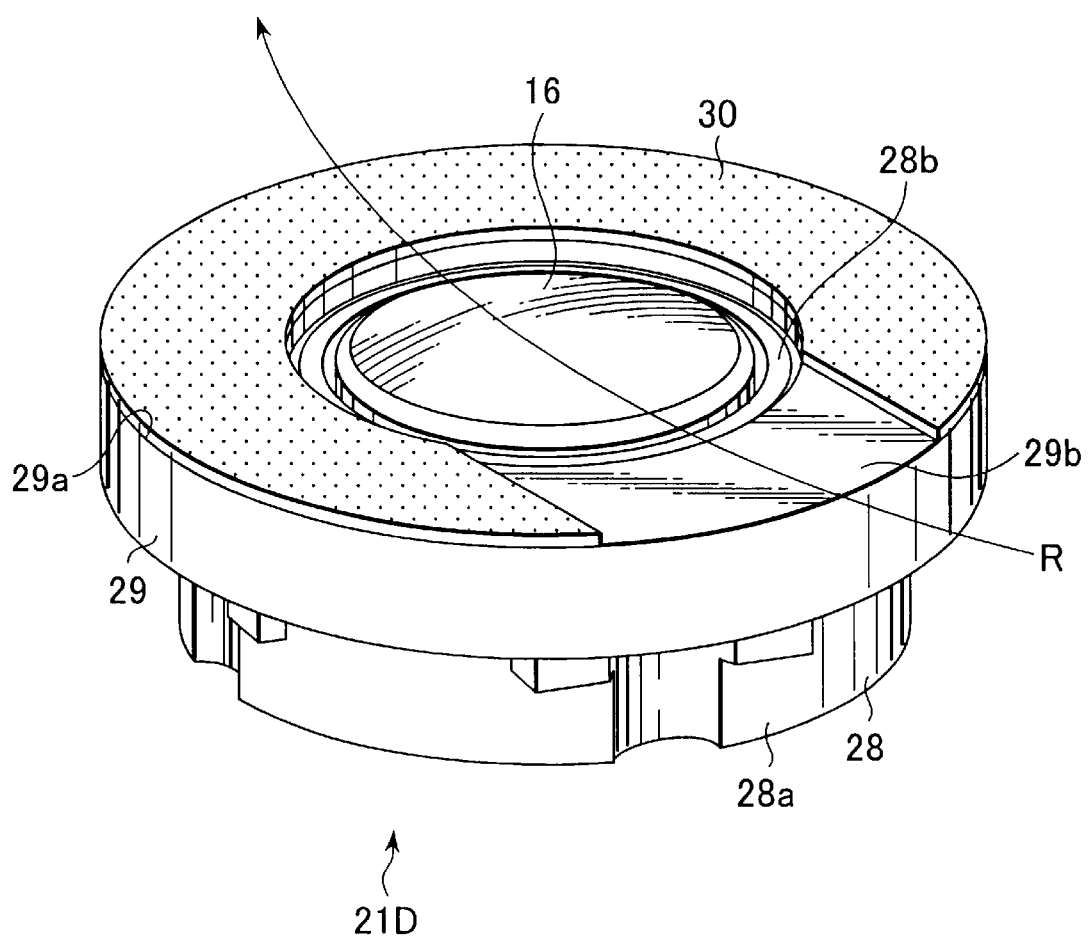
FIG. 16 is a schematic perspective view of the principal part showing a fifth embodiment.

FIG. 16 shows the fifth embodiment.

In the lens holder 21D of the fifth embodiment 5, the coating layer 30 is formed on the disk side end face 29a of the lens protector 29 outside of a portion 29b (hereinafter referred to as stepped surface) positioned on the upstream side of the objective lens 16 with respect to the rotation (the rotating direction is indicated by an arrow R) of the optical disk 2. The coating layer 30 is projected over the objective lens 16 toward the optical disk 2.

The significance of forming the stepped surface 29b is the same as the previous description by FIGS. 6 and 7.

That is, the stepped surface 29b is provided on a portion corresponding to the upstream side of the objective lens 16 with respect to the rotation of the optical disk 2, and the stepped surface 29b is located more distant from the optical disk 2 than the coating layer 30, whereby even if the focus servo comes off with the dust and the like put on the stepped surface 29b so that the optical disk 2 approaches to the objective lens 16 to collide with the coating layer 30, the stepped surface 29b on which the dust and the like 25, 25, . . . are put is located more distant from the optical disk 2 than the coating layer 30, so that the dust and the like 25, 25, . . . are prevented from being blown off to the downstream side of the rotation of the optical disk 2. Accordingly, the dust and the like will not shield the laser beam 17 transmitted through the objective lens 16.

Figure 17:
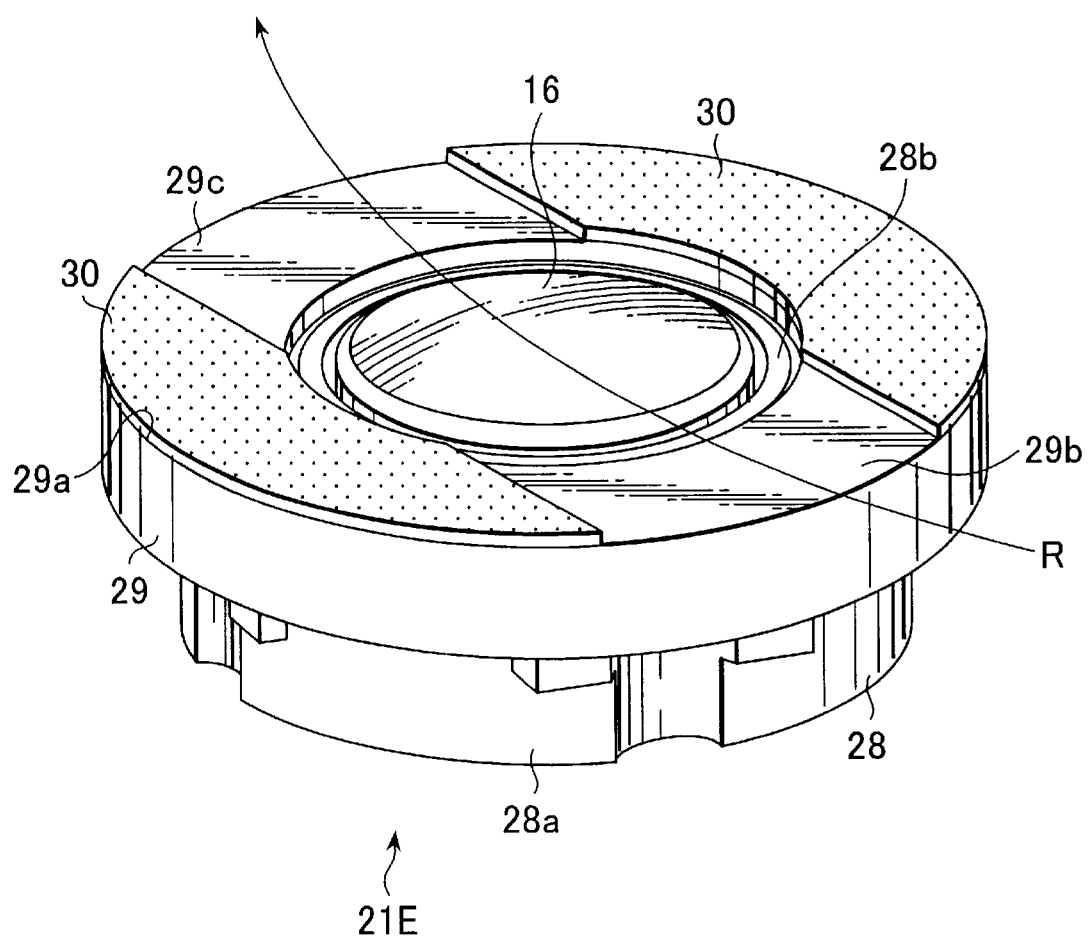
FIG. 17 is a schematic perspective view of the principal part showing a sixth embodiment.

FIG. 17 shows the sixth embodiment.

In the lens holder 21E of the sixth embodiment, the coating layers 30, 30 are formed on the disk side end face 29a of the lens protector 29 outside of a portion 29b (stepped surface) positioned on the upstream side of the objective lens 16 and a portion 29c (downstream stepped surface) positioned on the downstream side with respect to the rotation (the rotating direction is indicated by an arrow R) of the optical disk 2. The coating layers 30, 30 are projected over the objective lens 16 toward the optical disk 2.

The lens holder 21E of the sixth embodiment produces the same effect as the lens holder 21B of the third embodiment.

Prepared are lens holders having the structure shown in FIGS. 12 and 13, and provided with lens protectors 29 respectively formed of FL3093 (product name of fluorocarbon resin manufactured by NTN Co., Ltd.) (sample 1) and FE5000 (product name of fluorocarbon resin manufactured by NTN Co., Ltd.) (sample 2), and a lens holder having the structure of the fourth embodiment 4 and provided with a lens protector 29 formed of ABS resin and a coating layer 30 mainly composed of fluorocarbon resin (sample 3). The results of measuring the number of signal reading errors after collisions between the optical disk 2 and the respective samples are shown in FIGS. 18 to 20.

The measurement will be described in detail. The used optical disk is a high density recording optical disk shaped with a diameter of about 120 mm, and a thickness of about 1.2 mm (including the thickness of the protective layer 2b about 100 $\mu$m). Signals are read with such a setting that when the focus servo is on running, the space (work space) between the objective lens and the surface 2c of the optical disc is about 150 $\mu$m, the space between the surface 2c of the optical disk 2 and the lens protector 29 (or the coating layer 30 formed on the lens protector 29) is about 120 $\mu$m, and the space between the disk side end face (or the disk side end face of the coating layer 30) of the lens protector 29 and the objective lens 16 is about 30 $\mu$m (See FIG. 15).

The samples 1 and 2 are measured as in the following. After 1000 collisions, as for the sample 1, how many signal reading errors per track are caused in odd-numbered tracks from the 27000th track to the 28000th track is measured, as for the sample 2, how many signal reading errors per track are caused in odd-numbered tracks from the 19000th track to the 20000th track is measured, and as for the sample 3, after 2000 collisions, how many signal reading errors per track are caused in odd-numbered tracks from the 62000th track to the 63000th track is measured. One collision damages the optical disk 2 extending over a width for about 24,000 tracks.

Figure 18:
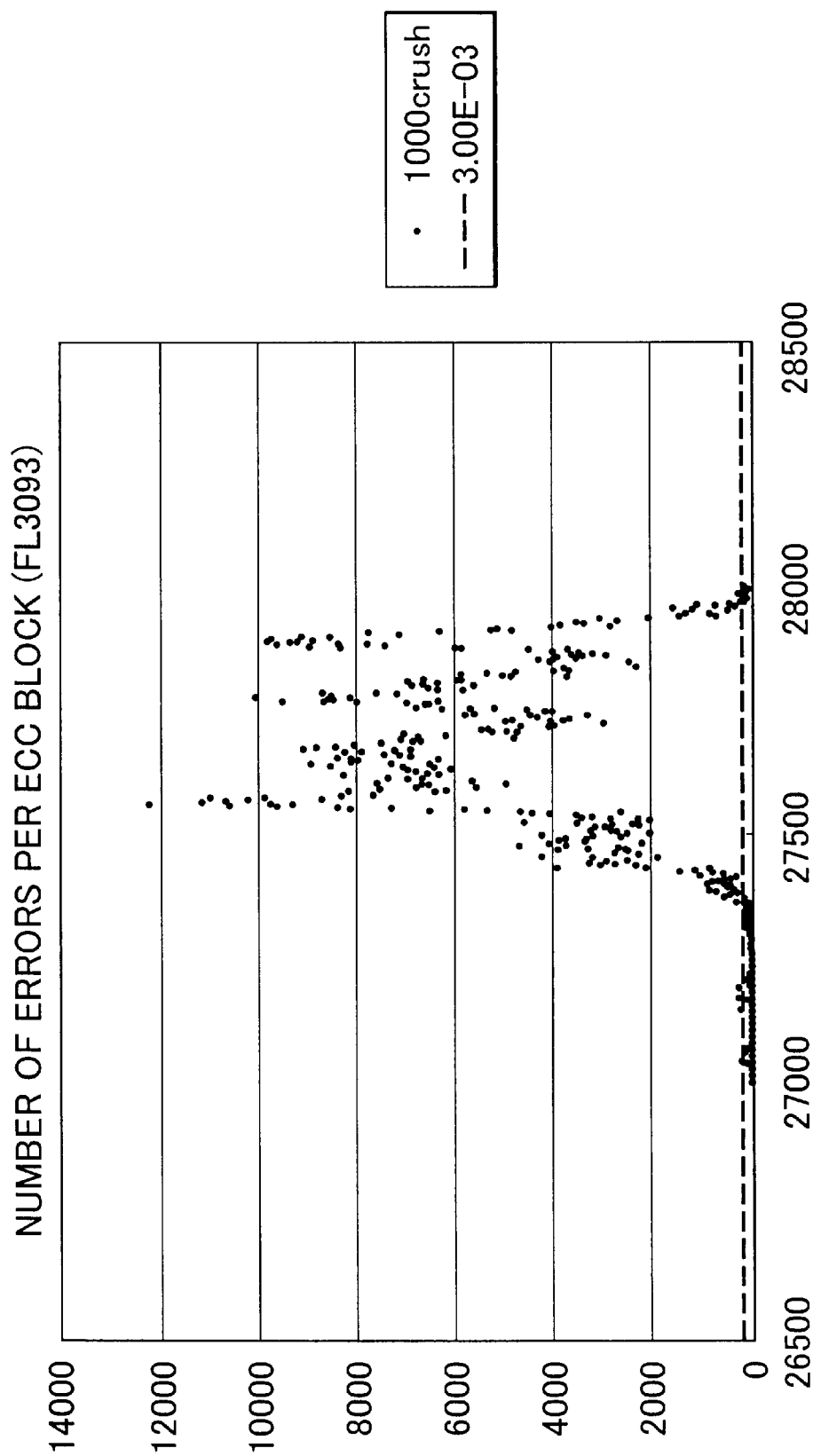
FIG. 18 is a graph showing the results of conducting tests in reading signals after collision of an optical disk with a lens holder of the structure shown in FIGS. 12 and 13.
Figure 19:
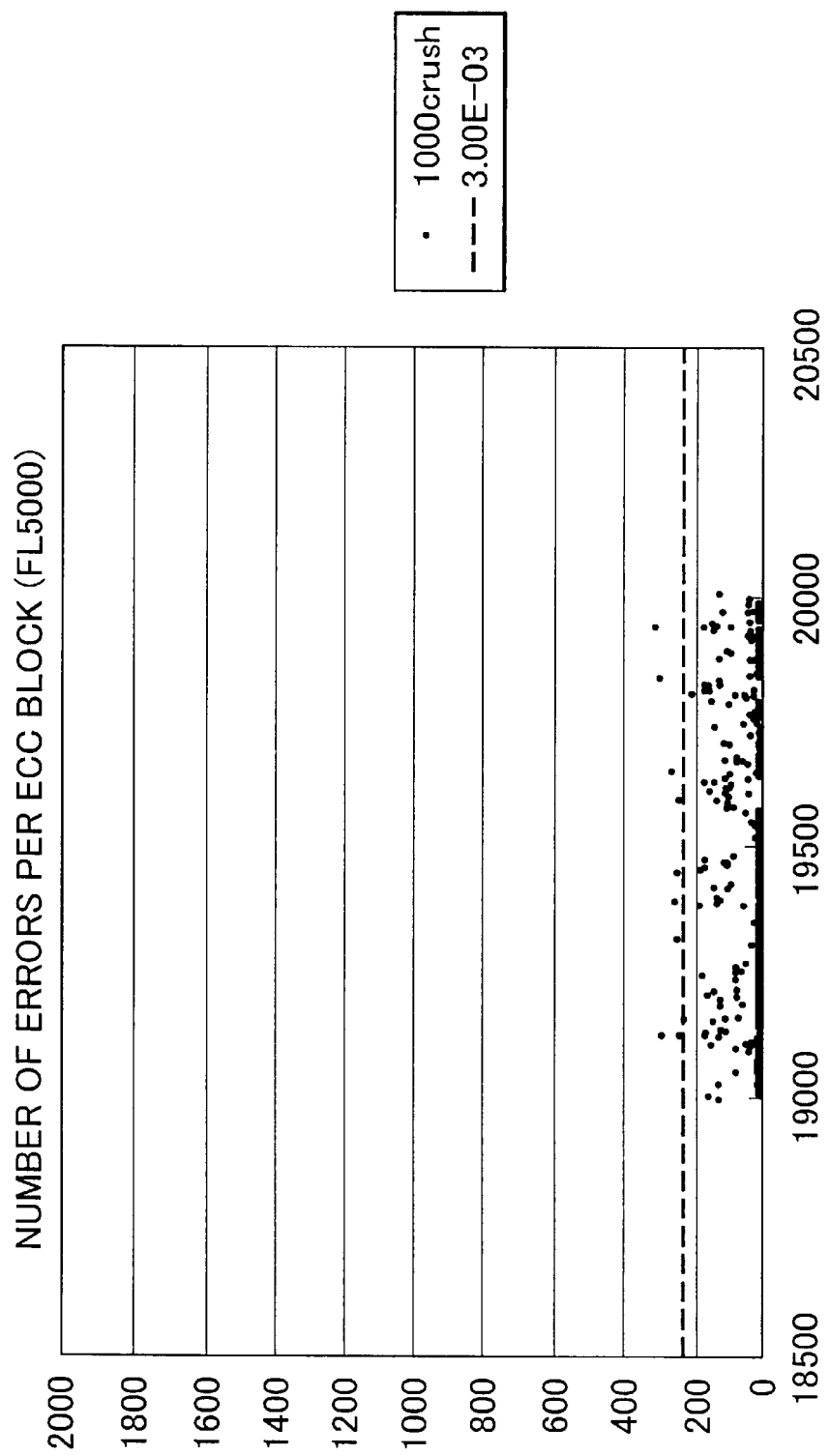
FIG. 19 is a graph showing the results of conducting tests in reading signals after collision of the optical disk with another lens holder of the structure shown in FIGS. 12 and 13.
Figure 20:
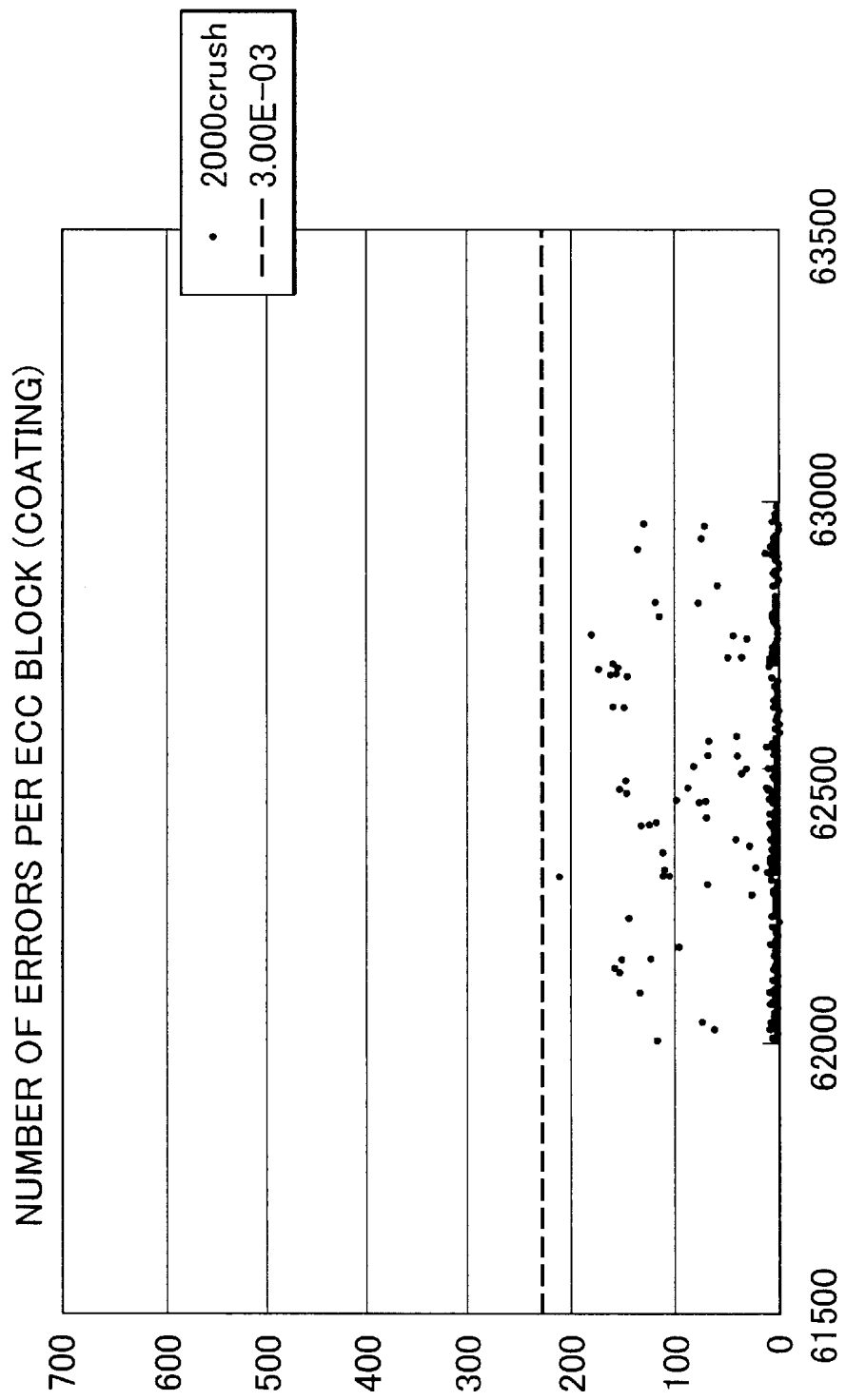
FIG. 20 is a graph showing the results of conducting tests in reading signals after collision of the optical disk with the lens holder of the fourth embodiment.

In the graphs of FIGS. 18 to 20, the track number enters the horizontal axis, the number of signal reading errors enter the vertical axis, and the line of 3.00E-03 shows a target value allowable in specification. The result of the similar measurement on the conventional optical pickup apparatus is that after 1,000 collisions, it is quite impossible to read a signal.

It is found from FIG. 18 that with the sample 1, 12,000 signal reading errors or more per track at maximum are caused, signal reading does not become quite impossible.

It is found from FIG. 19 that with the sample 2, the number of errors is below the target value in most of tracks, and in only a few tracks, signal reading errors above the target value are caused.

It is found from FIG. 20 that with the sample 3, even after 2,000 collisions which is twice as large as the number of times of collisions of the sample 1 and the sample 2, in all of the tracks, the number of signal reading errors is lower than the target value, so the very satisfactory result can be obtained.

Figure 21:
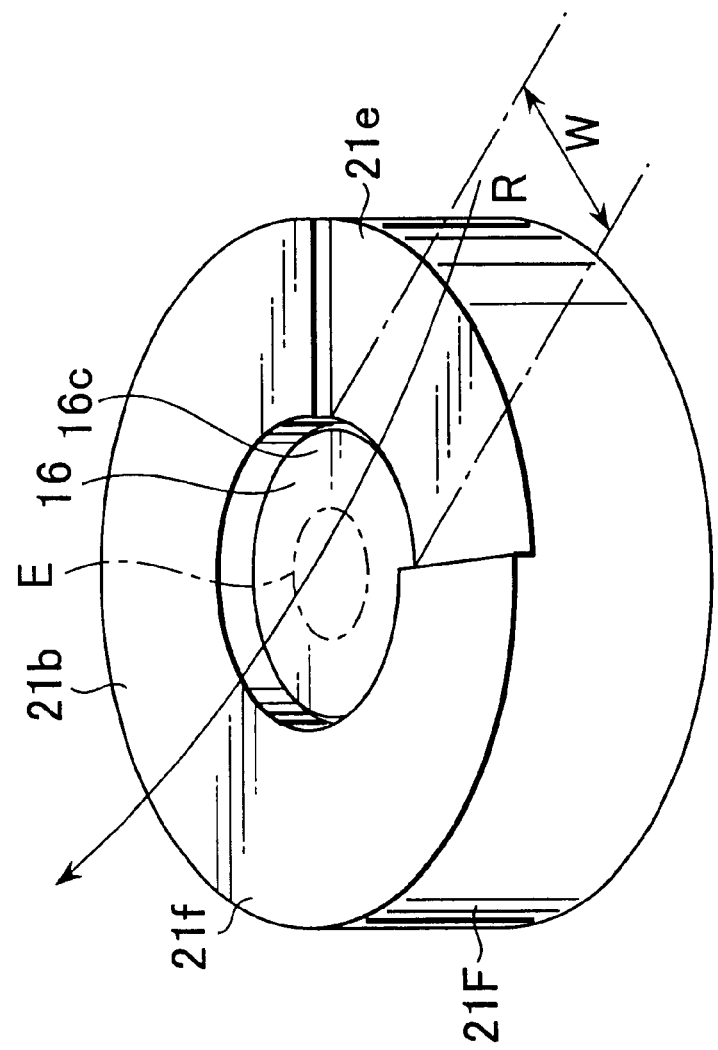
FIG. 21 is a perspective view showing a seventh embodiment with FIG. 22.

FIGS. 21 and 22 show the seventh embodiment.

In the lens holder 21F of the seventh embodiment, a portion outside of a portion 21e (hereinafter referred to as stepped surface) positioned on the upstream side of the objective lens 16 with respect to the rotation of the optical disk 2 in the disk side end face 21b is formed as an objective lens protective surface 21f positioned closer to the optical disk 2 than the stepped surface 21e. The objective lens protective surface 21f is projected over the front lens 16a of the objective lens 16 toward the optical disk 2.

According to the seventh embodiment, the objective lens protective surface 21f formed on the disk side end face 21b of the lens holder 21F is projected over the objective lens 16 toward the optical disk 2, whereby when the focus servo comes off, the objective lens protective surface 21f collides with the optical disk 2 before the objective lens 16 collides with the optical disk 2, so that the objective lens 16 will not be damaged.

In the seventh embodiment, the optical disk 2 comes into surface contact with the objective lens protective surface 21f, so that the optical disk 2 goes with a slight damage.

In order to reduce damage of the optical disk 2 due to a collision between the lens holder 21F and the optical disk 2, the objective lens protective surface 21f may be formed of a material softer than the optical disk 2 and having favorable slidability.

The significance of forming the stepped surface 21e is the same as that described by FIGS. 6 and 7 in the second embodiment, and the stepped surface 21e is located more distant from the optical disk 2 than the objective lens protective surface 21f, whereby when the dust and the like 25, 25, . . . are put on the stepped surface 21e, even if the focus servo comes off so that the optical disk 2 approaches to the objective lens 16 to collide with the objective lens protective surface 21f, the dust and the like 25, 25, . . . are prevented from being blown off to the downstream side of the rotation of the optical disk 2. Accordingly, the dust and the like will not shield the laser beam 17 transmitted through the objective lens 16.

The laser beam 17 is transmitted through the central part of the objective lens 16, and a transmission area E (area surrounded with a dash-single-dot line) of the laser beam 17 in the lens surface 16c on the optical disk 2 side of the objective lens 16 is shown in FIGS. 21 and 22.

Accordingly, when the focus servo comes off so that the optical disk 2 approaches to the objective lens 16 to collide with the lens holder 21F, the dust and the like 25, 25, . . . put on the objective lens protective surface 21f are probably blown off to the downstream side of the rotation of the optical disk 2, but the dust and the like 25, 25, . . . put on the stepped surface 21e are prevented from being blown off to the downstream side of the rotation of the optical disk 2. Accordingly, the width W of the end part on the inner peripheral side of the stepped surface 21e of the lens holder 21F can be made smaller than the diameter D1 of the objective lens. It is desirable to make the width W of the end part on the inner peripheral side of the stepped surface 21e of the lens holder 21F larger than the diameter D2 of the transmission area E so that when the dust and the like 25, 25, . . . put on the objective lens protective surface 21f are blown off to the downstream side of the rotation of the optical disk 2, they may not shield the transmission area E.

A coating layer made of a material softer than the optical disk 2 and having favorable slidability such as the above fluorocarbon resin coating material mainly composed of fluorocarbon resin may be formed on the objective lens protective surface 21f of the lens holder 21F.

The coating layer is thus formed on the objective lens protective surface 21f, whereby when the focus servo comes off, the optical disk 2 collides with the coating layer, so that the optical disk 2 is hardly damaged so as to decrease the risk of being disabled from reading a signal due to the collision.

FIGS. 23 and 24 show the eighth embodiment of the invention.

The lens holder 21G of the eighth embodiment is constituted by a rectangular part 31 substantially shaped like a flat plate and disposed on the optical disk 2 side, and a cylindrical part 32 disposed on the opposite side to the optical disk 2 with the rectangular part 31 interposed between them. The lens holder 21G is so constructed that in the disk side end face 31a of the rectangular part 31, four separated parts outside of a portion 31b positioned on the upstream side of the objective lens 16 with respect to the rotation (the rotating direction is indicated by an arrow R) of the optical disk 2, a portion 31c positioned on the downstream side of the objective lens 16, and portions 31d, 31e positioned intersecting perpendicularly to the portions 31b, 31c (hereinafter the portions 31b, 31c, 31d, 31e are referred to as stepped surface) are formed as objective lens protective surfaces 31f, 31f, . . . positioned closer to the optical disk 2 than the stepped surfaces 31b, 31c, 31d, 31e. The objective lens protective surface 31f, 31f, . . . are projected over the front lens 16a of the objective lens 16 toward the optical disk 2.

According to the eighth embodiment, the objective lens protective surfaces 31f, 31f, . . . formed on the disk side end face 31a of the lens holder 21G are projected over the objective lens 16 toward the optical disk 2, whereby when the focus servo comes off, one of the objective lens protective surfaces 31f, 31f, . . . collides with the optical disk 2 before the objective lens 16 collides with the optical disk 2 so that the objective lens 16 is prevented from being damaged.

According to the eighth embodiment, the optical disk 2 comes into surface contact with the objective lens protective surfaces 31f, 31f, . . . so that the optical disk 2 goes with a slight damage.

In order to reduce damage of the optical disk 2 due to the collision between the lens holder 21G and the optical disk 2, the objective lens protective surfaces 31f, 31f, may be formed of a material softer than the optical disk 2 and having favorable slidability.

The significance of forming the stepped surface 31b is the same as that described in the seventh embodiment.

The width W' of the stepped surface 31b of the lens holder 21G is made smaller than the diameter D1 of the objective lens 16 and larger than the diameter D2 of the transmission area E for the same reason as that of the seventh embodiment.

A coating layer made of a material softer than the optical disk 2 and having favorable slidability such as the above fluorocarbon resin coating material mainly composed of fluorocarbon resin may be formed on the objective lens protective surfaces 31f, 31f, . . . of the lens holder 21G.

The coating layer is thus formed on the objective lens protective surfaces 31f, 31f, . . . , whereby when the focus servo comes off, the optical disk 2 collides with the coating layer, so that the optical disk 2 is hardly damaged so as to decrease the risk of being disabled from reading a signal due to the collision.

In the lens holder 21G of the eighth embodiment, the downstream stepped surface 31c has no special function. In the case of partially forming the coating layer, however, similarly to the lens holder 21B of the third embodiment, produced is the effect of requiring lower accuracy in masking to reduce the cost of forming the coating layer.

The concrete shape of each part shown in the above embodiments is only one example in carrying out the invention, and is not intended to limit the technical scope of the invention.

It will be appreciated that according to the invention, as described above, the optical pickup apparatus, which is adapted to record and/or read a signal to and from the signal recording layer by applying a light beam to the signal recording layer of the optical disk, includes the objective lens for applying a light beam to the signal recording layer, the lens holder for supporting the objective lens, and the coating layer formed on the disk side end face of the lens holder, that is, the end face opposite to the optical disk, and the coating layer is formed of the material softer than the optical disk and having favorable slidability, and projected over the objective lens toward the optical disk.

Accordingly, in the optical pickup apparatus of the invention, even if the focus servo comes off so that the optical disk approaches to the objective lens, the optical disk comes into contact with the coating layer before it collides with the objective lens, thereby preventing a collision between the optical disk and the objective lens. Although the optical disk comes into contact with the coating layer, the coating layer is formed of the material softer than the optical disk and having favorable slidability, so that the optical disk goes with a slight damage.

According to another aspect, the coating layer is disposed closer to the optical disk than the portion positioned on the upstream side of the objective lens with respect to the rotation of the optical disk in the disk side end face of the lens holder, whereby the dust and the like adhering to the disk side end face of the lens holder can be prevented from adhering to the objective lens due to the collision with the optical disk.

According to another aspect of the invention, the coating layer is disposed closer to the optical disk than the portions positioned on the upstream and downstream sides of the objective lens with respect to the rotation of the optical disk in the disk side end face of the lens holder, whereby the dust and the like adhering to the disk side end face of the lens holder can be prevented from adhering to the objective lens due to the collision with the optical disk, the coating layer can be easily formed, and a smaller quantity of a material to be used for forming the coating layer will be sufficient.

According to another aspect of the invention, the main ingredient of the coating layer is the fluorocarbon resin, so that the damage given to the optical disk by the collision can be remarkably reduced.

According to another aspect of the invention, the optical pickup apparatus is used for recording and/or reading a signal to and from the optical disk with a diameter of about 120 mm and a thickness of about 1.2 mm including the thickness of the protective layer for covering the signal recording layer about 100 $\mu$m, and with the focus servo put on running, the space between the objective lens and the surface of the disk is about 150 $\mu$m, and the space between the coating layer and the surface of the disk is about 120 $\mu$m, whereby the signal can be read and/or recorded with high density, and the damage of the optical disk can be reduced regardless of an increase in risk of the collision between the optical disk and the lens holder due to reduction of the work space caused by development into high density.

It will be appreciated that according to the invention, as described above, another optical pickup apparatus, which is adapted to record and/or read a signal to and from the signal recording layer by applying a light beam to the signal recording layer of the optical disk, includes the objective lens for applying a light beam to the signal recording layer, the lens holder for supporting the objective lens, the lens protector provided on the lens holder to surround the periphery of the objective lens, and the coating layer formed on the disk side end face of the lens protector, that is, the end face opposite to the optical disk, and the coating layer is formed of a material softer than the optical disk and having favorable slidability and projected over the objective lens toward the optical disk.

Accordingly, in another optical pickup apparatus of the invention, even if the focus servo comes off so that the optical disk approaches to the objective lens, the optical disk comes into contact with the coating layer before it collides with the objective lens, so that the collision between the optical disk and the objective lens can be prevented.

Although the optical disk comes into contact with the coating layer, the coating layer is formed of the material softer than the optical disk and having favorable slidability, so that the optical disk goes with a slight damage.

According to another aspect of the invention, the coating layer is disposed closer to the optical disk than the portion positioned on the upstream side of the objective lens with respect to the rotation of the optical disk in the disk side end face of the lens protector, whereby the dust and the like adhering to the disk side end face of the lens protector can be prevented from adhering to the objective lens due to the collision with the optical disk.

According to another aspect of the invention, the coating layer is disposed closer to the optical disk than the portions positioned on the upstream and downstream sides of the objective lens with respect to the rotation of the optical disk in the disk side end face of the lens protector, whereby the dust and the like adhering to the disk side end face of the lens protector can be prevented from adhering to the objective lens due to the collision with the optical disk, the coating layer can be easily formed, and a smaller quantity of a material to be used for forming the coating layer will be sufficient.

According to another aspect of the invention, the main ingredient of the coating layer is the fluorocarbon resin so that the damage given to the optical disk by the collision can be remarkably reduced.

According to another aspect of the invention, the optical pickup apparatus is used for recording and/or reading a signal to and from the optical disk with a diameter of about 120 mm and a thickness of about 1.2 mm including the thickness of the protective layer for covering the signal recording layer about 100 $\mu$m, and with the focus servo put on running, the space between the objective lens and the surface of the disk is about 150 $\mu$m, and the space between the coating layer and the surface of the disk is about 120 $\mu$m, whereby the signal can be read and/recorded with high density, and the damage of the optical disk can be reduced regardless of an increase in risk of the collision between the optical disk and the lens holder due to reduction of the work space caused by development into high density.

It will be appreciated that according to the invention, as described above, still another optical pickup apparatus, which is adapted to record and/or read a signal to and from the signal recording layer by applying a light beam to the signal recording layer of the optical disk, includes the objective lens for applying a light beam to the signal recording layer and the lens holder for supporting the objective lens, the disk side end face of the lens holder, that is, the end face opposite to the optical disk and positioned in the periphery of the objective lens is disposed closer to the optical disk than the objective lens, an objective lens protective surface is formed to prevent a collision between the objective lens and the optical disk when the lens holder approaches to the optical disk, and the objective lens protective surface is not formed at least in a portion with a designated width positioned on the upstream side of the objective lens with respect to the rotation of the optical disk in the disk side end face of the lens holder.

Accordingly, in the still another optical pickup apparatus of the invention, even if the focus servo comes off so that the optical disk approaches to the objective lens, the optical disk comes into contact with the objective lens protective surface before it collides with the objective lens, so that the collision between the optical disk and the objective lens can be avoided to prevent damage of the objective lens.

Furthermore, the optical disk comes into surface contact with the objective lens protective surface so that the optical disk goes with a slight damage.

According to another aspect of the invention, the coating layer made of the material softer than the optical disk and having favorable slidability is formed on the objective lens protective surface so that the optical disk goes with a slight damage.

According to another aspect of the invention, the objective lens protective surface is not formed on a portion with a designated width positioned on the downstream side of the objective lens with respect to the rotation of the optical disk in the disk side end face of the lens holder, whereby the coating layer can be easily formed, and a smaller quantity of the material to be used for forming the coating layer will be sufficient.

It will be appreciated that according to the invention, as described above, the disk drive apparatus includes the disk rotating device for rotating the optical disk and the optical pickup apparatus adapted to record and/or read a signal to and from the signal recording layer by applying a light beam to the signal recording layer of the rotating optical disk, the optical pickup apparatus includes the objective lens for applying the light beam to the signal recording layer, the lens holder for supporting the objective lens, and the coating layer formed on the disk side end face of the lens holder, that is, the end face opposite to the optical disk, and the coating layer is formed of the material softer than the optical disk and having favorable slidability and projected over the objective lens toward the optical disk.

Accordingly, in the disk drive apparatus of the invention, even if the focus servo comes off so that the optical disk approaches to the objective lens, the optical disk comes into contact with the coating layer before it collides with the objective lens so that the collision between the optical disk and the objective lens can be prevented.

Although the optical disk comes into contact with the coating layer, the coating layer is formed of the material softer than the optical disk and having favorable slidability so that the optical disk goes with a slight damage.

According to another aspect of the invention, the coating layer is disposed closer to the optical disk than the portion positioned on the upstream side of the objective lens with respect to the rotation of the optical disk in the disk side end face of the lens holder, whereby the dust and the like adhering to the disk side end face of the lens holder can be prevented from adhering to the objective lens due to the collision with the optical disk.

According to another aspect of the invention, the coating layer is disposed closer to the optical disk than the portions positioned on the upstream and downstream sides of the objective lens with the rotation of the optical disk in the disk side end face of the lens holder, whereby the dust and the like adhering to the disk side end face of the lens holder can be prevented from adhering to the objective lens due to the collision with the optical disk, the coating layer can be easily formed, and a smaller quantity of a material to be used for forming the coating layer will be sufficient.

According to another aspect of the invention, the main ingredient of the coating layer is the fluorocarbon resin, so that the damage given to the optical disk by the collision can be remarkably reduced.

According to another aspect of the invention, the disk drive apparatus is used for recording and/or reading a signal to and from the optical disk with a diameter of about 120 mm and a thickness of about 1.2 mm including the thickness of the protective layer for covering the signal recording layer about 100 $\mu$m, and with the focus servo put on running, the space between the objective lens and the surface of the disk is about 150 $\mu$m, and the space between the coating layer and the surface of the disk is about 120 $\mu$m, whereby the signal can be read and/recorded with high density, and the damage of the optical disk can be reduced regardless of an increase in risk of the collision between the optical disk and the lens holder due to reduction of the work space caused by development into high density.

It will be appreciated that according to the invention, as described above, another disk drive apparatus includes the disk rotating device for rotating the optical disk and the optical pickup apparatus adapted to record and/or read a signal to and from the signal recording layer by applying a light beam to the signal recording layer of the rotating optical disk, the optical pickup apparatus includes the objective lens for applying the light beam to the signal recording layer, the lens holder for supporting the objective lens, and the lens protector provided on the lens holder to surround the periphery of the objective lens, and the coating layer formed on the disk side end face of the lens protector, that is, the end face opposite to the optical disk, and the coating layer is formed of the material softer than the optical disk and having favorable slidability and projected over the objective lens toward the optical disk.

Accordingly, in another disk drive apparatus of the invention, even if the focus servo comes off so that the optical disk approaches to the objective lens, the optical disk comes into contact with the coating layer before it collides with the objective lens so as to prevent the collision between the optical disk and the objective lens.

Although the optical disk comes into contact with the coating layer, the coating layer is formed of the material softer than the optical disk and having favorable slidability, so that the optical disk goes with a slight damage.

According to another aspect of the invention, the coating layer is disposed closer to the optical disk than the portion positioned on the upstream side of the objective lens with respect to the rotation of the optical disk in the disk side end face of the lens protector, whereby the dust and the like adhering to the disk side end face of the lens protector can be prevented from adhering to the objective lens due to the collision with the optical disk.

According to another aspect of the invention, the coating layer is disposed closer to the optical disk than the portions positioned on the upstream and downstream sides of the objective lens with the rotation of the optical disk in the disk side end face of the lens protector, whereby the dust and the like adhering to the disk side end face of the lens protector can be prevented from adhering to the objective lens due to the collision with the optical disk, the coating layer can be easily formed, and a smaller quantity of a material to be used for forming the coating layer will be sufficient.

According to another aspect of the invention, the main ingredient of the coating layer is the fluorocarbon resin, so that the damage given to the optical disk by the collision can be reduced.

According to another aspect of the invention, the disk drive apparatus is used for recording and/or reading a signal to and from the optical disk with a diameter of about 120 mm and a thickness of about 1.2 mm including the thickness of the protective layer for covering the signal recording layer about 100 μm, and with the focus servo put on running, the space between the objective lens and the surface of the disk is about 150 μm, and the space between the coating layer and the surface of the disk is about 120 μm, whereby the signal can be read and/recorded with high density, and the damage of the optical disk can be reduced regardless of an increase in risk of the collision between the optical disk and the lens holder due to reduction of the work space caused by development into high density.

It will be appreciated that according to the invention, as described above, still another disk drive apparatus includes the disk rotating device for rotating the optical disk and the optical pickup apparatus adapted to record and/or read a signal to and from the signal recording layer by applying a light beam to the signal recording layer of the rotating optical disk, the optical pickup apparatus includes the objective lens for applying the light beam to the signal recording layer, and the lens holder for supporting the objective lens, and the disk side end face of the lens holder, that is, the end face opposite to the optical disk and positioned in the periphery of the objective lens is disposed close to the optical disk than the objective lens, an objective lens protective surface is formed for preventing the collision between the objective lens and the optical disk when the lens holder approaches to the optical disk, and in the disk side end face of the lens holder, the objective lens protective surface is not formed at least in the portion with a designated width positioned on the upstream side of the objective lens with respect to the rotation of the optical disk.

Accordingly, in the still another disk drive apparatus, even if the focus servo comes off so that the optical disk approaches to the objective lens, the optical disk comes into contact with the objective lens protective surface before it collides with the objective lens so that the collision between the optical disk and the objective lens can be avoided to prevent damage of the objective lens.

Furthermore, the optical disk comes into surface contact with the objective lens protective surface, so that the optical disk goes with a slight damage.

According to another aspect of the invention, the coating layer made of the material softer than the optical disk and having favorable slidability is formed on the objective lens protective surface so that the optical disk goes with a slight damage.

According to another aspect of the invention, in the disk side end face of the lens holder, the objective lens protective surface is not formed at least in the portion with a designated width positioned on the downstream side of the objective lens with respect to the rotation of the optical disk, whereby the coating layer can be easily formed and a smaller quantity of a material to be used for forming the coating layer will be sufficient.

What is claimed is:

1. An optical pickup apparatus, which is adapted to record and/or read a signal to a signal recording layer of an optical disk by applying a light beam to said signal recording layer, comprising:

an objective lens for applying a light beam to said signal recording layer;

a lens holder for supporting said objective lens; and a coating layer formed on the disk side end face of said lens holder, that is, the end face opposite to said optical disk, wherein said coating layer is formed of a material softer than said optical disk and having favorable slidability, and projected over said objective lens toward said optical disk, and wherein said coating layer is disposed closer to said optical disk than portions positioned on the upstream and downstream sides of said objective lens with respect to the rotation of said optical disk in the disk side end face of said lens holder.

2. The optical pickup apparatus according to claim 1, wherein said coating layer is disposed closer to said optical disk than a portion positioned on the upstream side of said objective lens with respect to the rotation of said optical disk in the disk side end face of said lens holder.

3. The optical pickup apparatus according to claim 1, wherein the main ingredient of said coating layer is fluorocarbon resin.

4. The optical pickup apparatus according to claim 2, wherein the main ingredient of said coating layer is fluorocarbon resin.

5. The optical pickup apparatus according to claim 1, wherein the main ingredient of said coating layer is fluorocarbon resin.

6. The optical pickup apparatus according to claim 1, wherein said optical pickup apparatus is used for recording and/or reading a signal to an optical disk with a diameter of about 120 mm and a thickness of about 1.2 mm including the thickness of a protective layer for covering said signal recording layer about 100 fÊm, and with a focus servo put on running, the space between said objective lens and the surface of said disk is about 150 fÊm, and the space between said coating layer and the surface of said disk is about 120 fÊm.

7. An optical pickup apparatus, which is adapted to record and/or read a signal to a signal recording layer of an optical disk by applying a light beam to said signal recording layer, comprising:

an objective lens for applying a light beam to said signal recording layer;

a lens holder for supporting said objective lens; a lens protector provided on said lens holder to surround the periphery of said objective lens; and a coating layer formed on the disk side end face of said lens protector, that is, the end face opposite to said optical disk, wherein said coating layer is formed of a material softer than said optical disk and having favorable slidability and projected over said objective lens toward said optical disk.

8. The optical pickup apparatus according to claim 7, wherein said coating layer is disposed closer to said optical disk than a portion positioned on the upstream side of said objective lens with respect to the rotation of said optical disk in the disk side end face of said lens protector.

9. The optical pickup apparatus according to claim 7, wherein said coating layer is disposed closer to said optical disk than portions positioned on the upstream and downstream sides of said objective lens with respect to the rotation of said optical disk in the disk side end face of said lens protector.

10. The optical pickup apparatus according to claim 7, wherein the main ingredient of said coating layer is fluorocarbon resin.

11. The optical pickup apparatus according to claim 8, wherein the main ingredient of said coating layer is fluorocarbon resin.

12. The optical pickup apparatus according to claim 9, wherein the main ingredient of said coating layer is fluorocarbon resin.

13. The optical pickup apparatus according to claim 7, wherein said optical pickup apparatus is used for recording and/or reading a signal to an optical disk with a diameter of about 120 mm and a thickness of about 1.2 mm including the thickness of a protective layer for covering said signal recording layer about 100 $f\hat{E}m$, and with a focus servo put on running, the space between said objective lens and the surface of said disk is about 150 $f\hat{E}m$, and the space between said coating layer and the surface of said disk is about 120 $f\hat{E}m$.

14. An optical pickup apparatus, which is adapted to record and/or read a signal to a signal recording layer of an optical disk by applying a light beam to said signal recording layer, comprising:
- an objective lens for applying a light beam to said signal recording layer; and
- a lens holder for supporting said objective lens,
- wherein the disk side end face of said lens holder, that is, the end face opposite to said optical disk and positioned in the periphery of said objective lens is disposed closer to said optical disk than said objective lens,
- an objective lens protective surface is formed for preventing a collision between said objective lens and said optical disk when said lens holder approaches to said optical disk, and
- in the disk side end face of said lens holder, said objective lens protective surface is not formed at least in a portion with a designated width positioned on the upstream side of said objective lens with respect to the rotation of said optical disk.

15. The optical pickup apparatus according to claim 14, wherein a coating layer made of a material softer than said optical disk and having favorable slidability is formed on said objective lens protective surface.

16. The optical pickup apparatus according to claim 15, wherein in the disk side end face of said lens holder, an objective lens protective surface is not formed in a portion with a designated width positioned on the downstream side of said objective lens with respect to the rotation of said optical disk.

17. A disk drive apparatus, comprising: a disk rotating device for rotating an optical disk and an optical pickup apparatus adapted to record and/or read a signal to and from a signal recording layer by applying a light beam to said signal recording layer of said rotating optical disk,
- wherein said optical pickup apparatus comprises an objective lens for applying a light beam to said signal recording layer, a lens holder for supporting said objective lens, and a coating layer formed on the disk side end face of said lens holder, that is, the end face opposite to said optical disk, and
- said coating layer is formed of a material softer than the optical disk and having favorable slidability and projected over said objective lens toward said optical disk,
- wherein said coating layer is disposed closer to said optical disk than portions positioned on the upstream and downstream sides of said objective lens with respect to the rotation of said optical disk in the disk side end face of said lens holder.

18. The disk drive apparatus according to claim 17, wherein said coating layer is disposed closer to said optical disk than a portion positioned on the upstream side of said objective lens with respect to the rotation of said optical disk in the disk side end face of said lens holder.

19. The disk drive apparatus according to claim 17, wherein the main ingredient of said coating layer is fluorocarbon resin.

20. The disk drive apparatus according to claim 18, wherein the main ingredient of said coating layer is fluorocarbon resin.

21. The disk drive apparatus according to claim 17, wherein the main ingredient of said coating layer is fluorocarbon resin.

22. The disk drive apparatus according to claim 17, wherein said disk drive apparatus is used for recording and/or reading a signal to an optical disk with a diameter of about 120 mm and a thickness of about 1.2 mm including the thickness of a protective layer for covering said signal recording layer about 100 $f\hat{E}m$, and with a focus servo put on running, the space between said objective lens and the surface of said disk is about 150 $f\hat{E}m$, and the space between said coating layer and the surface of said disk is about 120 $f\hat{E}m$.

23. A disk drive apparatus, comprising: a disk rotating device for rotating the optical disk and an optical pickup apparatus adapted to record and/or read a signal to and from a signal recording layer by applying a light beam to said signal recording layer of said rotating optical disk,
- said optical pickup apparatus comprises an objective lens for applying a light beam to said signal recording layer, a lens holder for supporting said objective lens, and a lens protector provided on said lens holder to surround the periphery of the objective lens, and a coating layer formed on the disk side end face of said lens protector, that is, the end face opposite to said optical disk, and
- said coating layer is formed of a material softer than said optical disk and having favorable slidability and projected over said objective lens toward said optical disk.

24. The disk drive apparatus according to claim 23, wherein said coating layer is disposed closer to said optical disk than a portion positioned on the upstream side of said objective lens with respect to the rotation of said optical disk in the disk side end face of said lens protector.

25. The disk drive apparatus according to claim 23, wherein said coating layer is disposed closer to said optical disk than portions positioned on the upstream and downstream sides of said objective lens with respect to the rotation of said optical disk in the disk side end face of said lens protector.

26. The disk drive apparatus according to claim 23, wherein the main ingredient of said coating layer is fluorocarbon resin.

27. The disk drive apparatus according to claim 24, wherein the main ingredient of said coating layer is fluorocarbon resin.

28. The disk drive apparatus according to claim 25, wherein the main ingredient of said coating layer is fluorocarbon resin.

29. The disk drive apparatus according to claim 23, wherein said disk drive apparatus is used for recording and/or reading a signal to an optical disk with a diameter of about 120 mm and a thickness of about 1.2 mm including the thickness of a protective layer for covering said signal recording layer about 100 μm, and with a focus servo put on running, the space between said objective lens and the surface of said disk is about 150 μm, and the space between said coating layer and the surface of said disk is about 120 μm.

30. A disk drive apparatus, comprising: a disk rotating device for rotating an optical disk and an optical pickup apparatus adapted to record and/or read a signal to and from a signal recording layer by applying a light beam to said signal recording layer of said rotating optical disk, wherein said optical pickup apparatus comprises an objective lens for applying a light beam to said signal recording layer, and a lens holder for supporting said objective lens, the disk side end face of said lens holder, that is, the end face opposite to said optical disk and positioned in the periphery of said objective lens is disposed closer to said optical disk than said objective lens, an objective lens protective surface is formed for preventing a collision between said objective lens and said optical disk when said lens holder approaches to said optical disk, and in the disk side end face of said lens holder, said objective lens protective surface is not formed at least in a portion with a designated width positioned on the upstream side of said objective lens with respect to the rotation of said optical disk.

31. The disk drive apparatus according to claim 30, wherein a coating layer made of a material softer than said optical disk and having favorable slidability is formed on said objective lens protective surface.

32. The disk drive apparatus according to claim 31, wherein in the disk side end face of said lens holder, said objective lens protective surface is not formed in a portion with a designated width positioned on the downstream side of said objective lens with respect to the rotation of said optical disk.

* * * * *